US012490043B2

(12) United States Patent
Xu et al.

(10) Patent No.: US 12,490,043 B2
(45) Date of Patent: Dec. 2, 2025

(54) SYSTEMS AND METHODS FOR DELIVERING PERSONALIZED AUDIO TO MULTIPLE USERS SIMULTANEOUSLY THROUGH SPEAKERS

(71) Applicant: Adeia Guides Inc., San Jose, CA (US)

(72) Inventors: Ning Xu, Irvine, CA (US); Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 284 days.

(21) Appl. No.: 18/200,433

(22) Filed: May 22, 2023

(65) Prior Publication Data

US 2024/0397277 A1 Nov. 28, 2024

(51) Int. Cl.
*H04S 7/00* (2006.01)
*H04R 3/12* (2006.01)
*H04S 3/00* (2006.01)

(52) U.S. Cl.
CPC .............. *H04S 7/303* (2013.01); *H04S 3/008* (2013.01); *H04S 7/307* (2013.01); *H04S 2400/01* (2013.01); *H04S 2400/13* (2013.01)

(58) Field of Classification Search
None
See application file for complete search history.

(56) References Cited

U.S. PATENT DOCUMENTS 10,097,944 B2 10/2018 Christoph et al.
10,506,362 B1 * 12/2019 Gomes ................ G10L 21/0208
2018/0027350 A1 * 1/2018 Buerger ................... H04R 5/02 381/303
2020/0178016 A1 * 6/2020 Beran ....................... H04R 5/04
2022/0014868 A1 * 1/2022 Binn ........................ H04S 7/303
2022/0093077 A1 * 3/2022 Starobin .......... G10K 11/17881
2022/0182772 A1 * 6/2022 Dodds .................. H04R 25/353
2022/0345845 A1 * 10/2022 Tsingos .................... H04R 3/12
(Continued)

FOREIGN PATENT DOCUMENTS

WO 2022119988 A1 6/2022

OTHER PUBLICATIONS

"Audioscenic Partners with Razer and THX to Launch Desktop Soundbar with 3D Beamforming Technology and Head-Tracking AI," audioXpress, https://audioxpress.com/news/audioscenic-partners-with-razer-and-thx-to-launch-desktop-soundbar-with-3d-beamforming.
(Continued)

*Primary Examiner* — Qin Zhu
(74) *Attorney, Agent, or Firm* — HALEY GUILIANO LLP

(57) ABSTRACT

Systems and methods are provided herein for generating personalized audio settings for different users listening to the same piece of media content. For example, the system may receive a first audio setting for a first user corresponding to a first volume level for a first frequency and a second audio setting for a second user corresponding to a second volume level for the first frequency. The system may then use the first audio setting, second audio setting, position of the first user, and position of the second user to calculate a weight for each speaker of a plurality of speakers. Each speaker of the plurality of speakers then outputs the first frequency at the respective calculated weight, resulting in the first user perceiving the first frequency at the first volume level and the second user perceiving the first frequency at the second volume level.

20 Claims, 11 Drawing Sheets

(56) References Cited

U.S. PATENT DOCUMENTS

| | | | | |
|---|---|---|---|---|
| 2023/0217204 A1* | 7/2023 | Boothe | H04S 7/303 381/301 |
| 2023/0283976 A1* | 9/2023 | Ninan | H04S 7/304 381/303 |
| 2023/0329913 A1* | 10/2023 | Li | G10L 15/22 |

OTHER PUBLICATIONS

"Customize headphone audio levels on your iPhone or iPad," Apple, https://support.apple.com/en-us/HT211218 (2022).
"Mimi Hearing Test App," Mimi, https://mimi.io/mimi-hearing-test-app.
"Razer Leviathan V2 Pro AI beamforming gaming soundbar is ideal for personalized audio," The Gadget Flow, https://thegadgetflow.com/portfolio/razer-leviathan-v2pro-ai-beamforming-gaming-soundbar-is-ideal-for-ultra-personalized-audio/.
Bass, "Sonos Beam (Gen 2) Review: Same Body, Greater Sound," The AXO, https://theaxo.com/2021/sonos-beam-gen-2-review/ (2021).
Blackwell, et al., "Summary Health Statistics for U.S. Adults: National Health Interview Survey, 2012," National Center for Health Statistics, Vital Health Stat 10(260), 2014.
Sharma, Adamya et al., "How to use your phone to control your Android TV wirelessly," Android Authority, https://www.androidauthority.com/control-android-tv-with-phone-1165440/ (2022).
Liu, Kaikai, et al., "Guoguo: Enabling Fine-Grained Smartphone Localization via Acoustic Anchors," IEEE Transactions on Mobile Computing, vol. 15, No. 5, (May 2016).
Xiao, Jiang, et al., "A Survey on Wireless Indoor Localization from the Device Perspective," ACM Comput. Surv. 49, 2, Article 25, 31 pages (Jun. 2016).

* cited by examiner

300

700

800

SYSTEMS AND METHODS FOR DELIVERING PERSONALIZED AUDIO TO MULTIPLE USERS SIMULTANEOUSLY THROUGH SPEAKERS

BACKGROUND

The present disclosure relates to the delivery of audio content, and in particular to techniques for delivering personalized audio content to multiple users.

SUMMARY

Many households have one or more media devices (e.g., televisions, laptops, desktops, tablets, smartphones, etc.) that use one or more speakers to output media content. Most media devices provide adjustable audio settings. For example, a user may be able to adjust the audio equalization settings so that certain frequencies are louder than other frequencies. Adjustable audio settings are particularly useful because different users may have different audio preferences. Some users may have unique audio preferences for each individual ear. In some cases, audio preferences may be based on the hearing capabilities of a user. For example, a first user may suffer from hearing loss and prefer audio settings with increased volume. Although some media devices provide adjustable audio settings, said media devices are limited to outputting audio according to a single set of audio settings. Accordingly, a media device is only able to output audio according to the audio preferences of a single user despite multiple users (who have their own unique audio preferences) consuming the same audio. This situation often leads to a poor user experience. For example, a first user may prefer a louder volume and a second user may prefer a quieter volume. If the media device uses the audio settings for the first user, then the audio may be unpleasantly loud for the second user. If the media device uses the audio setting for the second user, then the first user may be unable to hear the audio. In view of these deficiencies, there exists a need for improved systems and methods for generating personalize audio for different users consuming the same piece of media content.

Accordingly, techniques are disclosed herein for providing personalized audio settings to different users listening to the same piece of media content. In an embodiment, given a set of speakers with known positions, a set of users with known positions and orientations, and known audio preferences on a per-frequency and per-ear basis for each of the users, the disclosed techniques enable a determination of output modulation, as a function of frequency, for each of the set of speakers that results in a desired perceived amplitude or volume for each of the particular frequencies for each of the users (or even for each ear of a single user). In an example implementation, a first device (e.g., a television) may uses a plurality of speakers to output audio. To personalize the outputted audio, the first device may receive a first audio profile associated with a first user and a second audio profile associated with a second user. The audio profiles may comprise one or more preferences. For example, the first audio profile may comprise a first frequency preference (e.g., perceived volume at a first level for a frequency) and the second audio profile may comprise a second frequency preference (e.g., perceived volume at a second level for the frequency). In some embodiments, allowing users to select frequency preferences provides an improved user experience when consuming media content. Different users (and even different ears of a single user) may be more or less sensitive to certain frequencies. For example, some users may struggle to hear certain frequencies at a low volume due to hearing impairments, old age, genetic differences, etc. Accordingly, these users can select preferences to increase the perceived volumes for frequencies that the users struggle to hear, allowing the users to more easily consume the piece of media content.

The first device may receive the audio profiles from the users. For example, the first user and the second user may input their respective audio profiles into a user interface of the first device. In another example, the first device may receive the audio profiles from devices (e.g., smartphones) associated with the users. The audio profiles may comprise audio settings (e.g., volume preferences for one or more frequencies) associated with the corresponding user. In an embodiment, each set of audio settings corresponds to a different audiogram for a user. An audiogram may be developed on a per-user or a per-ear basis. An audiogram may be a graph indicating the softest sounds a person can hear at different frequencies. In an embodiment, a horizontal axis (x-axis) of an audiogram represents frequency (pitch) from lowest to highest.

The lowest frequency tested may be 250 Hertz (Hz), and the highest frequency tested may be 8000 Hz, for example. In an embodiment, a vertical axis (y-axis) of the audiogram may represent the intensity (loudness) of sound in decibels (dB), with the lowest levels at the top of the graph. A "high" reading for a given frequency indicates a person can hear a sound at the given frequency at a relatively low intensity or volume. By contrast, a "low reading" indicates the user can only hear a sound at the given frequency when produced at a high volume, suggesting hearing loss. Sometimes the audio profiles may have different audio settings associated with different ears of the user. For example, the first audio profile associated with the first user may comprise a first set of audio settings and a second set of audio settings, where the first set of audio settings correspond to the left ear of the first user and the second set of audio settings correspond to the right ear of the first user.

The first device may detect the first user and the second user within a vicinity of the first device. For example, the first device may detect the first user by receiving a first signal from a first smartphone associated with the first user and may detect the second user by receiving a second signal from a second smartphone associated with the second user. In another example, the first device may use one or more sensors (e.g., proximity sensors, infrared sensors, etc.) to detect that the first user and the second user are within the vicinity of the first device. In response to detecting the first user and the second user, the first device may determine the distances between the users and the plurality of speakers. For example, the first device may determine a first plurality of distances comprising a first distance between the first user and a first speaker of the plurality of speakers and a second distance between the first user and a second speaker of the plurality of speakers. The first device may also determine a second plurality of distances comprising a third distance between the second user and the first speaker of the plurality of speakers and a fourth distance between the second user and the second speaker of the plurality of speakers.

The first device may also determine the directions of the plurality of speakers relative to the first plurality of distance and the second plurality of distance. For example, the first user may be a first distance (e.g., three meters) from the first speaker and the first speaker may be in front of and to the left of the first user. In such an example, the first speaker may be located 20 degrees to the left of the first user (assuming directly in front of the user is zero degrees). Accordingly, the first device may determine a first direction (e.g., 20 degrees) of the first distance (e.g., three meters) between the first user and the first speaker. The first device may determine and store the directions of the plurality of speakers relative to the users for all the determined distances. In some embodiments, the first device determines the described distances and/or directions using the same or similar methods used to detect the users. For example, the first device may use the first and second signals received from the devices associated with the users to approximate the locations of the first and second users and then use the locations to determine the first plurality of distance, second plurality of distances, and their corresponding directions relative to the users.

The first device may then determine one or more weights corresponding to one or more frequencies played at the plurality of speakers using the determined distances and directions. In some embodiments, the first device calculates a first weight and a second weight for a first frequency using a system of liner equations comprising values corresponding to the first plurality of distances, second plurality of distances, the first user's frequency preference for the first frequency (e.g., first frequency preference), the second user's frequency preference for the first frequency (e.g., second frequency preference), and a head-related transfer function (HRTF) that utilizes the determined directions described above. For example, the first device may determine a first weight for a first speaker to output a first frequency using the system of liner equations comprising the values described above. The first device may also determine a second weight for a second speaker to output the first frequency using the system of liner equations comprising the values described above.

The first device may then use the calculated weights when outputting audio for a piece of media content. For example, the first speaker and the second speaker may output different audio signals corresponding to the same piece of media content. For example, the first speaker may output a first audio signal, wherein the first frequency is outputted at the first weight calculated above. The second speaker may output a second audio signal, wherein the first frequency is outputted at the second weight calculated above. The first speaker outputting the first frequency at the first weight and the second speaker outputting the second frequency at the second weight allows the first user to hear the piece of media content according to the first user's frequency preference for the first frequency and the second user to hear the piece of media content according to the second user's frequency preference for the first frequency. Accordingly, using the techniques described herein, both users (and even individual ears of a user) can consume the same piece of media content while hearing the piece of media content according to their specified preferences.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
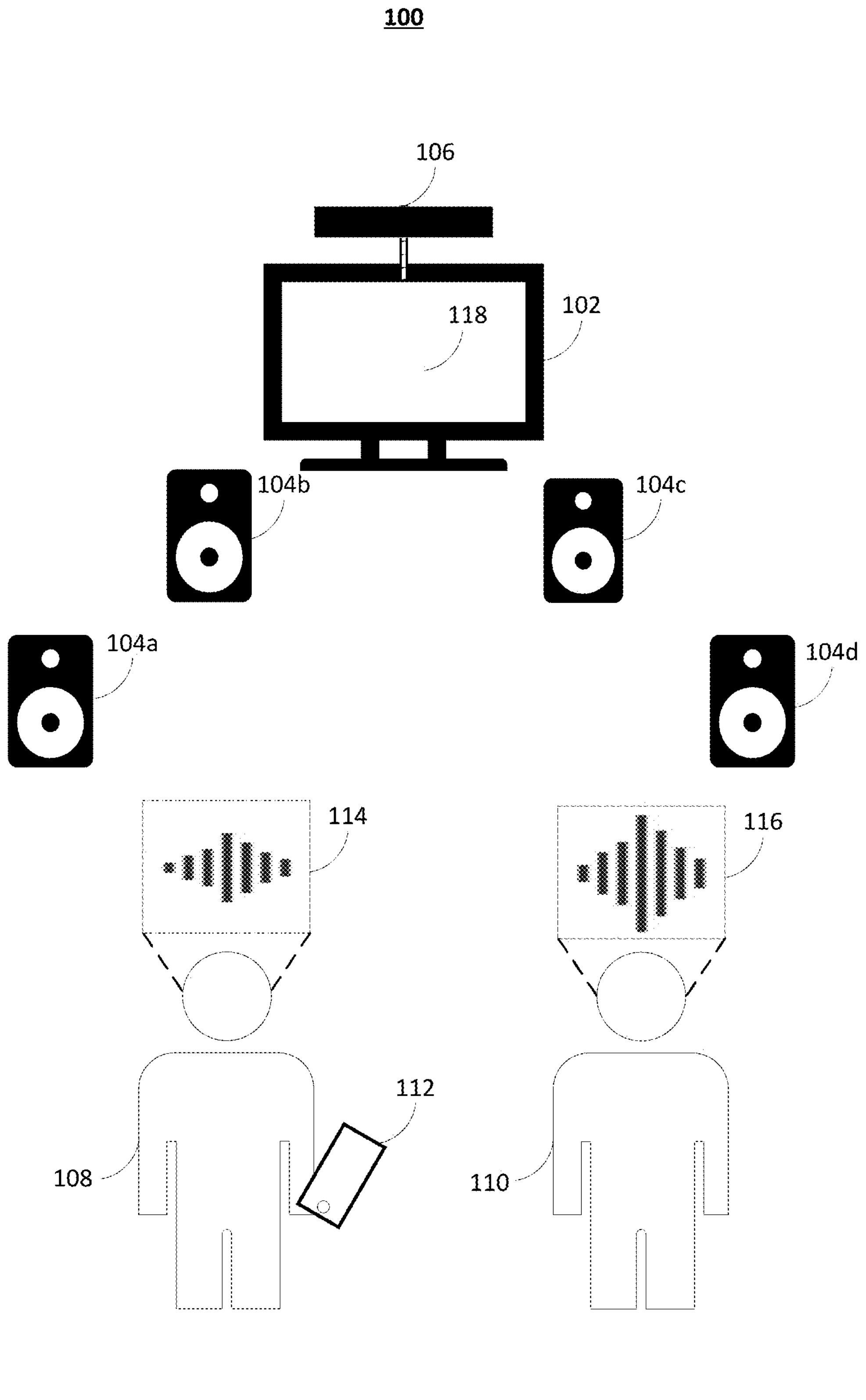
FIG. 1 shows an illustrative diagram of a system for providing personalized audio settings to different users listening to the same piece of media content, in accordance with embodiments of the disclosure.

FIG. 1 shows an illustrative diagram of a system 100 for providing personalized audio settings to different users listening to the same piece of media content. In some embodiments, the system 100 comprises a first device 102, a first speaker 104*a*, a second speaker 104*b*, a third speaker 104*c*, and a fourth speaker 104*d*. In some embodiments, the first device 102 is a television, laptop, desktop, tablet, smartphone, and/or any other similar such device. The first device 102 may output audio signals using the speakers. For example, the first device 102 may display video data related to a piece of media content and the speakers may output audio signals related to the piece of media content. In some embodiments, the speakers and the first device 102 are incorporated into a single device. Although only four speakers are shown, any number of speakers may be used. In some embodiments, the first device 102 transmits one or more audio signals to the speakers using one or more wired connections. In some embodiments, the first device 102 transmits one or more audio signals to the speakers using one or more wireless connections (e.g., Bluetooth, Wi-Fi, etc.).

In some embodiments, the first device 102 has access to one or more audio profiles associated with one or more users. For example, the first device 102 may have access to a first audio profile associated with a first user 108 and may have access to a second audio profile associated with a second user 110. The first device 102 may receive the first and/or second audio profile from one or more devices. For example, the first device 102 may access one or more servers comprising one or more databases including the first and/or second audio profile. In another example, a second device 112 may transmit the first and/or second audio profile to the first device 102. In some embodiments, one or more users input one or more audio profiles using the first device 102. For example, the second user 110 may input the second audio profile using a user interface provided by the first device 102. In some embodiments, the first device 102 comprises storage and stores the one or more audio profiles using said storage.

In some embodiments, audio profiles comprise one or more frequency preferences. The frequency preferences may indicate preferred volume levels for one or more frequencies or range of frequencies. For example, the first audio profile for the first user 108 may comprise a first frequency preference indicating a first volume level for a first frequency and the second audio profile for the second user 110 may comprise a second frequency preference indicating a second volume level for the first frequency. In such an example, the first user 108 and the second user 110 have different frequency preferences for the first frequency. In another example, the first audio profile for the first user 108 may comprise a first frequency preference indicating a first volume level for a first frequency range and the second audio profile for the second user 110 may comprise a second frequency preference indicating a second volume level for the first frequency range.

The first user 108 may input one or more frequency preferences using one or more devices. For example, the first user 108 may use the second device 112 to input the first frequency preference. In some embodiments, one or more frequency preferences correspond to an audiogram associated with the users. For example, a first audiogram comprising information related to one or more frequencies may be generated for the first user 108. The first device 102 may use the information related to one or more frequencies to determine one or more frequency preferences (e.g., the first frequency preference corresponding to the first frequency). Audio profiles may have different audio settings associated with different ears for one or more users. For example, the first audio profile associated with the first user 108 may comprise the first frequency preference for the left ear of the first user 108 and the second frequency preference for the right ear of the first user 108.

In some embodiments, the first device 102 detects the first user 108 and the second user 110 within a vicinity of the first device 102. For example, the first device 102 may detect the first user 108 by receiving a signal from the second device 112. In some embodiment, the signal from the second device 112 also comprises the first audio profile associated with the first user 108. In some embodiments, the signal comprises one or more frequency preferences associated with the first user 108. In another example, the first device 108 may use a sensor 106 to detect that the first user 108 and the second user 110 are within the vicinity of the first device 102. The sensor 106 may be an image sensor, proximity sensor, infrared sensor, and/or any similar such sensor. Although only one sensor is shown, the system 100 may use more than one sensor.

In some embodiments, the first device 102 detects one or more users once the one of more users enters the vicinity of the first device 102. For example, once the first user 108 walks into the vicinity of the first device 102 the first device 102 may detect the first user 108 using any of the methods described herein. In some embodiments, the first device 102 detects one or more users in response to an input. For example, the first user 108 may use a remote, user interface provided by the first device 102, and/or the second device 112 to input a command requesting the first device 102 to output a piece of media content. In response to receiving the input from the first user 108, the first device 102 may detect the one or more users. In response to detecting the first user 108 and the second user 110, the first device 102 may determine the distances between the users and the speakers. For example, the first device 102 may determine a first plurality of distances comprising the distances between the first user 108 and each speaker and may determine a second plurality of distances comprising the distances between the second user 110 and each speaker.

In some embodiments, the first device 102 determines the first plurality of distances and/or the second plurality of distances using the information used to detect the first user and the second user. For example, if the first device 102 detected the first user 108 using the sensor 106, the first device 102 may use the information received from the sensor 106 to determine the first plurality of distances. The information captured by the sensor 106 may comprise the position of the first user 108. The first device 102 may use the position of the first user 108 and the positions of the speakers to determine the first plurality of distances. In some embodiments, the first device 102 stores the positions of the speakers in a database and uses the stored positions of the speakers to determine the first plurality of distances and/or the second plurality of distances. In some embodiments, the information captured by the sensor 106 comprises the positions of the speakers. In such an embodiment, the first device 102 may use the received positions of the speakers and the received position of the first user 108 to determine the first plurality of distances. The first device 102 may also use the received positions of the speakers and the received position of the second user 110 to determine the second plurality of distances. In another example, if the first device 102 detects a user by receiving a signal from an additional device, the first device 102 may use the signal to determine a plurality of distances. For example, the first device 102 may detect the first user by receiving a signal from the second device 112. The signal may comprise the location of the second device 112. In some embodiments, the first device 102 determines the first plurality of distances using the location of the second device 112.

In some embodiments, the first device 102 determines the first plurality of distances and/or the second plurality of distances using information received from one or more users. For example, the first device 102 may receive a position from the first user 108 when the first user 108 inputs their position (e.g., on the couch, three meters from the television, etc.) using a remote, user interface provided by the first device 102, and/or the second device 112. The first device 102 may determine the first plurality of distances using the received position. In another example, the first user 108 may input the distances between the first user and the speakers. The first device 102 may use the inputted distances as the first plurality of distances.

The first device 102 may also determine the orientations of the first user 108 and the second user 110. In some embodiments, the orientations of the users are detected by the sensor 106. For example, the sensor 106 may detect (e.g., using facial recognition) which direction the first user 108 is facing. In some embodiments, one or more orientations are received by the first device 102. For example, the first device 102 may receive an orientation from the first user 108 when the first user 108 inputs their orientation (e.g., facing the first device 102) using a remote, user interface provided by the first device 102, and/or the second device 112. In some embodiments, the orientations of the users are approximated. For example, the first device 102 may determine that the first user 108 and/or the second user 110 are facing a display 118 of the first device 102 when the first device 102 is displaying content using the display 118. In another example, the first device 102 may determine that the first user 108 and/or the second user 110 are facing a direction based on their respective positions. For example, if the first user 108 is located at a first position where a couch is also located, the first device 102 may determine that the first user 108 is facing the same direction as the couch (e.g., sitting on the couch looking straight ahead).

In some embodiments, the first device 102 uses the orientations to determine a plurality of angles between the orientation of the users and the speakers. For example, if the first user 108 has a first orientation (e.g., facing straight ahead) the first device 102 may determine a first plurality of angles between the first orientation and the speakers. In some embodiments, the first device uses the same or similar methods to determine the distances between the users and the speakers to determine the angles between the orientation of the users and the speakers. For example, the first device 102 may use the determined orientation of the first user 108 and the stored locations of the speakers to determine the first plurality of angles.

The first device may then determine one or more weights corresponding to one or more frequencies played at the speakers using the determined distances and directions. In some embodiments, the first device 102 calculates a plurality of weights for the speakers to output a first frequency. For example, the first device 102 may use a system of liner equations to calculate a first weight for the first speaker 104*a* to output the first frequency, a second weight for the second speaker 104*b* to output the first frequency, a third weight for the third speaker 104*c* to output the first frequency, and a fourth weight for the fourth speaker 104*d* to output the first frequency. In some embodiments, the calculated weights correspond to amplitudes and/or phases of the outputted frequency. For example, the first weight may correspond to the first speaker 104*a* outputting the first frequency at a first amplitude and a first phase while the second weight may correspond to the second speaker 104*b* outputting the first frequency at a second amplitude and a second phase.

In some embodiments, the first device 102 calculates the weights for one or more frequencies specified by the audio profiles. For example, if the first and/or second audio profile specifies frequency preferences for five frequencies, the first device 102 calculates five sets of pluralities of weights for the speakers for the five specified frequencies. The first device 102 may use the calculated weights to generate one or more audio signals. In some embodiments, the one or more audio signals correspond to the same portion of a piece of media content. For example, the piece of media content may be the movie "Jaws" and each audio signal may correspond to the start of the "Jaws—Main Title" song. The first device 102 may generate different audio signals for the different speakers based on the calculated weights. For example, the first device 102 may generate a first audio signal for the first speaker 104*a*, a second audio signal for the second speaker 104*b*, a third audio signal for the third speaker 104*c*, and a fourth audio signal for the fourth speaker 104*d*. In such an example, the first audio signal causes the first speaker 104*a* to output the first frequency at the first weight, the second audio signal causes the second speaker 104*b* to output the first frequency at the second weight, the third audio signal causes the third speaker 104*c* to output the first frequency at the third weight, and the fourth audio signal causes the fourth speaker 104*d* to output the first frequency at the fourth weight. Although only one frequency is discussed, the plurality of audio signals may have different weights associated with more than one frequency and/or frequency range.

The speakers outputting the same frequency at different weights allows the users to consume the same piece of media content while perceiving their own frequency preferences. For example, the first speaker 104*a* outputting the first frequency at the first weight, the second speaker 104*b* outputting the first frequency at the second weight, the third speaker 104*c* outputting the third frequency at the third weight, and the fourth speaker 104*d* outputting the fourth frequency at the fourth weight allows the first user 108 to perceive the first frequency at a first volume 114 and the second user 110 to perceive the first frequency at a second volume 116. In some embodiments, the first volume 114 of the first frequency perceived by the first user 108 corresponds to the first frequency preference of the first audio profile and the second volume 116 of the first frequency perceived by the second user 110 corresponds to the second frequency preference of the second audio profile. Accordingly, using the techniques described herein, both users can consume the same piece of media content ("Jaws") while hearing the piece of media content according to their specified preferences.

FIGS. 2A-2D show other illustrative diagram of a system 200 for providing personalized audio settings to different users listening to the same piece of media content, in accordance with embodiments of the disclosure. In some embodiments, the system 200 comprises a first device 202, a first speaker 204*a*, a second speaker 204*b*, a third speaker 204*c*, and a fourth speaker 204*d*. In some embodiments, the first device 202 is a television, laptop, desktop, tablet, smartphone, and/or any other similar such device. The first device 202 may output audio signals using the speakers. For example, the first device 102 may display video data related to a piece of media content and the speakers may output audio signals related to the piece of media content. Although only four speakers are shown, any number of speakers may be used. In some embodiments, the devices, speakers, and/or users described in FIGS. 2A-2D are the same or similar to the devices, speakers, and/or users described in FIG. 1.

In some embodiments, the first device 202 has access to one or more audio profiles associated with one or more users. For example, the first device 102 may have access to a first audio profile associated with a first user 206 and may have access to a second audio profile associated with a second user 208. In some embodiments, one or more audio profiles comprise frequency preferences corresponding to one or more ears of the users. For example, the first audio profile may comprise a first frequency preference for a first ear 210*a* of the first user 206 and a second frequency preference for a second ear 210*b* of the first user 206. In such an example, the first frequency preference may indicate a first volume level for a first frequency and the second frequency preference may indicate a second volume level for the first frequency. In some embodiments, one or more audio profiles may comprise frequency preferences that are the same for both ears. For example, the second audio profile may comprise a third frequency preference for a first ear 212*a* of the second user 208 and a fourth frequency preference for a second ear 212*b* of the second user 208. In such an example, the third frequency preference may indicate a third volume level for the first frequency and the fourth frequency preference may also indicate the third volume level for the first frequency.

The first device 202 may determine a position corresponding to one or more users. For example, the first device 202 may use a sensor (e.g., sensor 106), second device (e.g., second device 112), and/or similar such device to determine a first position of the first user 206 and/or a second position of the second user 208. In another example, the first device 202 receives (e.g., via a user interface) position information from the first user 206 and/or the second user 208. In some embodiments, the first device 202 uses the same method to determine the positions of both users. In some embodiments, the first device 202 uses different methods to determine the positions of the users. For example, the user device 202 may determine the first position for the first user 206 using a sensor and may determine the second position for the second user 208 using position information received from the second user 208. In some embodiments, the first device 202 uses the same or similar methods to determine positions related to the ears of the one or more users. For example, the first device 202 may use one or more sensors, to determine a position of the first ear 210*a* of the first user 206 and a position of the second ear 210*b* of the first user 206. In some embodiments, the first device 202 uses the positions of the user to approximate the positions of the ears of the users.

In some embodiments, the first device 202 also determines an orientation corresponding to one or more users. For example, the first device 202 may use a sensor (e.g., sensor 106), second device (e.g., second device 112), and/or similar such device to determine a first orientation 214 of the first user 206 and/or a second orientation 216 of the second user 208. In another example, the first device 202 receives (e.g., via a user interface) orientation information from the first user 206 and/or the second user 208. In some embodiments, the first device 202 uses the same method to determine the orientations of both users. In some embodiments, the first device 202 uses different methods to determine the orientations of the users. For example, the user device 202 may determine the first orientation 214 for the first user 206 using a sensor and may determine the second orientation 216 for the second user 208 using orientation information received from the second user 208.

In some embodiments, the first device 202 also determines positions of the speakers. In some embodiments, the positions of the speakers are predetermined. For example, the system 200 may require the first speaker 204*a* to be located in a first speaker position and the second speaker 204*b* to be located in a second speaker position. Accordingly, the first speaker 204*a* may be installed in the first speaker position and the second speaker 204*b* may be installed in the second speaker position. In such an example, the first device 202 may store the predetermined positions of the speakers. In some embodiments, the first device 202 detects one or more positions of the speakers once the speakers are installed. For example, the first device 202 may determine that the third speaker 204*c* is located at a third speaker position when the first user 206 installs the third speaker 204*c*. In some embodiments, the first device 202 uses a sensor (e.g., sensor 106), second device (e.g., second device 112), and/or similar such device to determine one or more speaker positions. In another example, the first device 202 receives (e.g., via a user interface) speaker position information from the first user 206 and/or the second user 208.

Figure 2A:
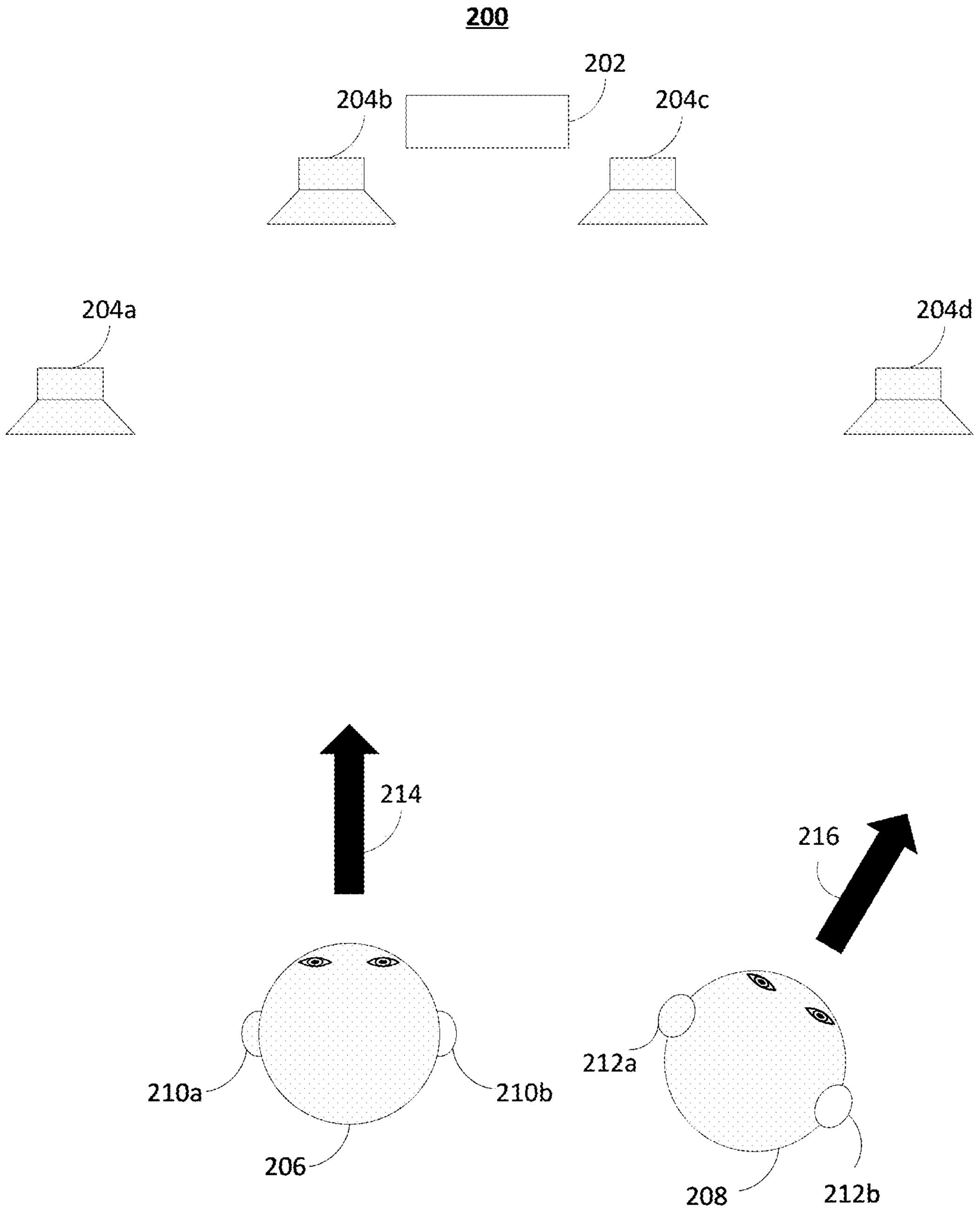
FIGS. 2A-2D show other illustrative diagram for providing personalized audio settings to different users listening to the same piece of media content, in accordance with embodiments of the disclosure.
Figure 2B:
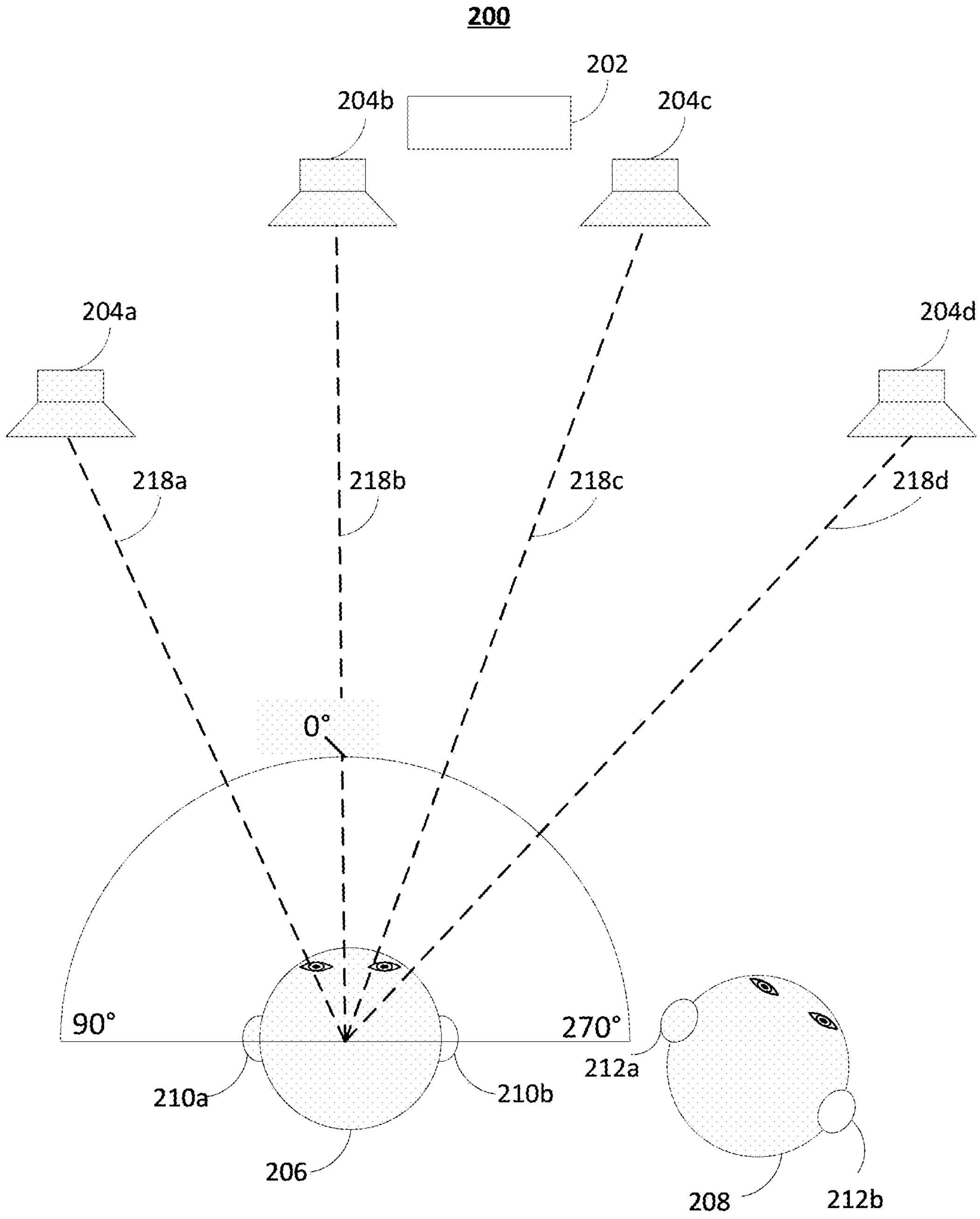

In FIG. 2B, the first device 202 may use the first position of the first user 206 and the positions of the speakers to determine a first plurality of distances. For example, the first device 202 may determine a first distance 218*a* between the first user 206 and the first speaker 204*a*, a second distance 218*b* between the first user 206 and the second speaker 204*b*, a third distance 218*c* between the first user 206 and the third speaker 204*c*, and a fourth distance 218*d* between the first user 206 and the fourth speaker 204*d*. In some embodiments, the first device 202 uses the first orientation 214 of the first user 206 and the positions of the speakers to determine a first plurality of angles. For example, the first device 202 may determine a first angle (e.g., 15°) between the first orientation 214 of the first user 206 and the first speaker 204*a*, a second angle (e.g., 0°) between the first orientation 214 of the first user 206 and the second speaker 204*b*, a third angle (e.g., 345°) between the first orientation 214 of the first user 206 and the third speaker 204*c*, and a fourth angle (e.g., 315°) between the first orientation 214 of the first user 206 and the fourth speaker 204*d*. In some embodiments, one or more of the distances of the first plurality of distances and/or one or more of the angles of the first plurality of angles are entered (e.g., via a second device, user interface, etc.) by a user (e.g., first user 206).

Figure 2C:
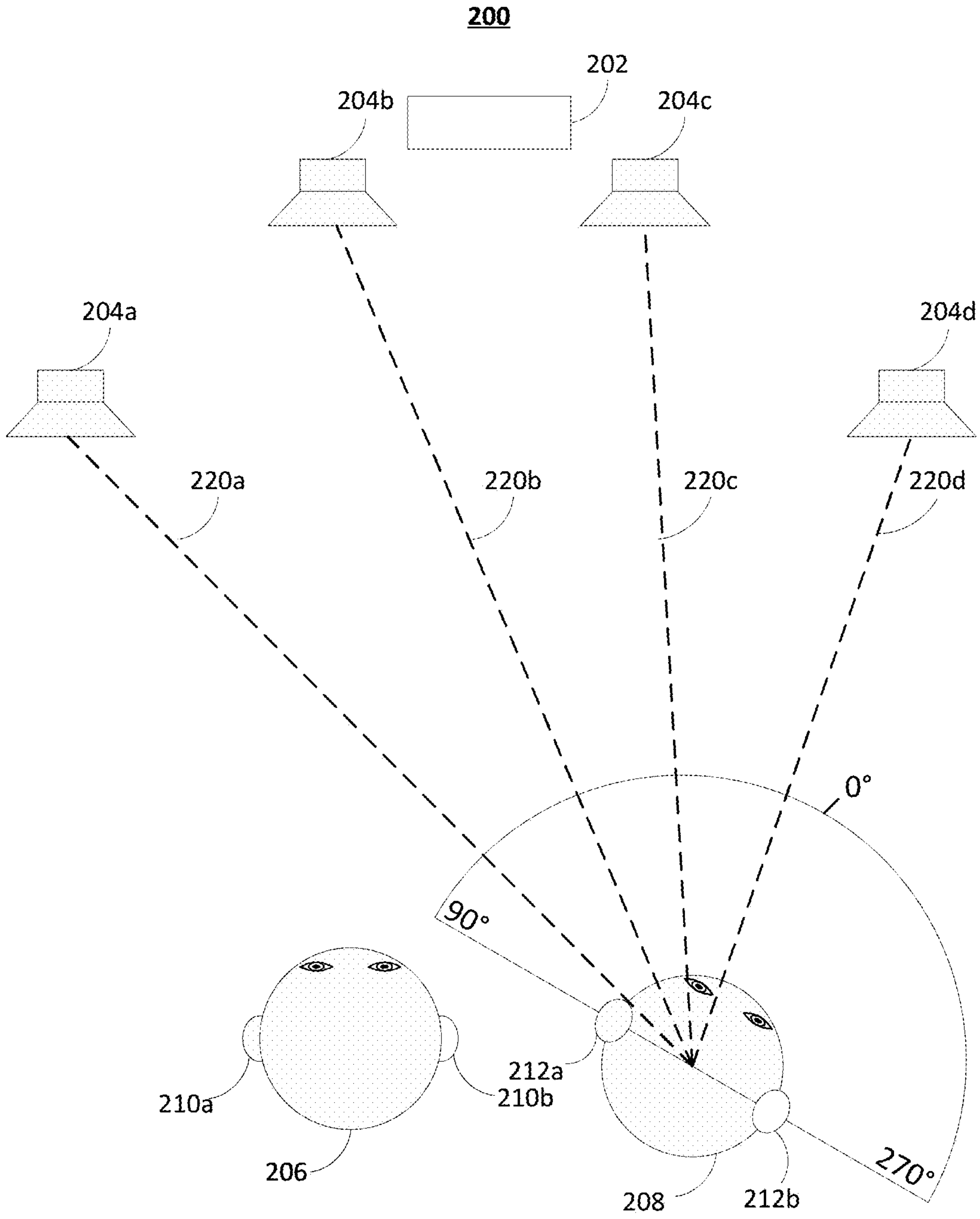
Figure 2D:
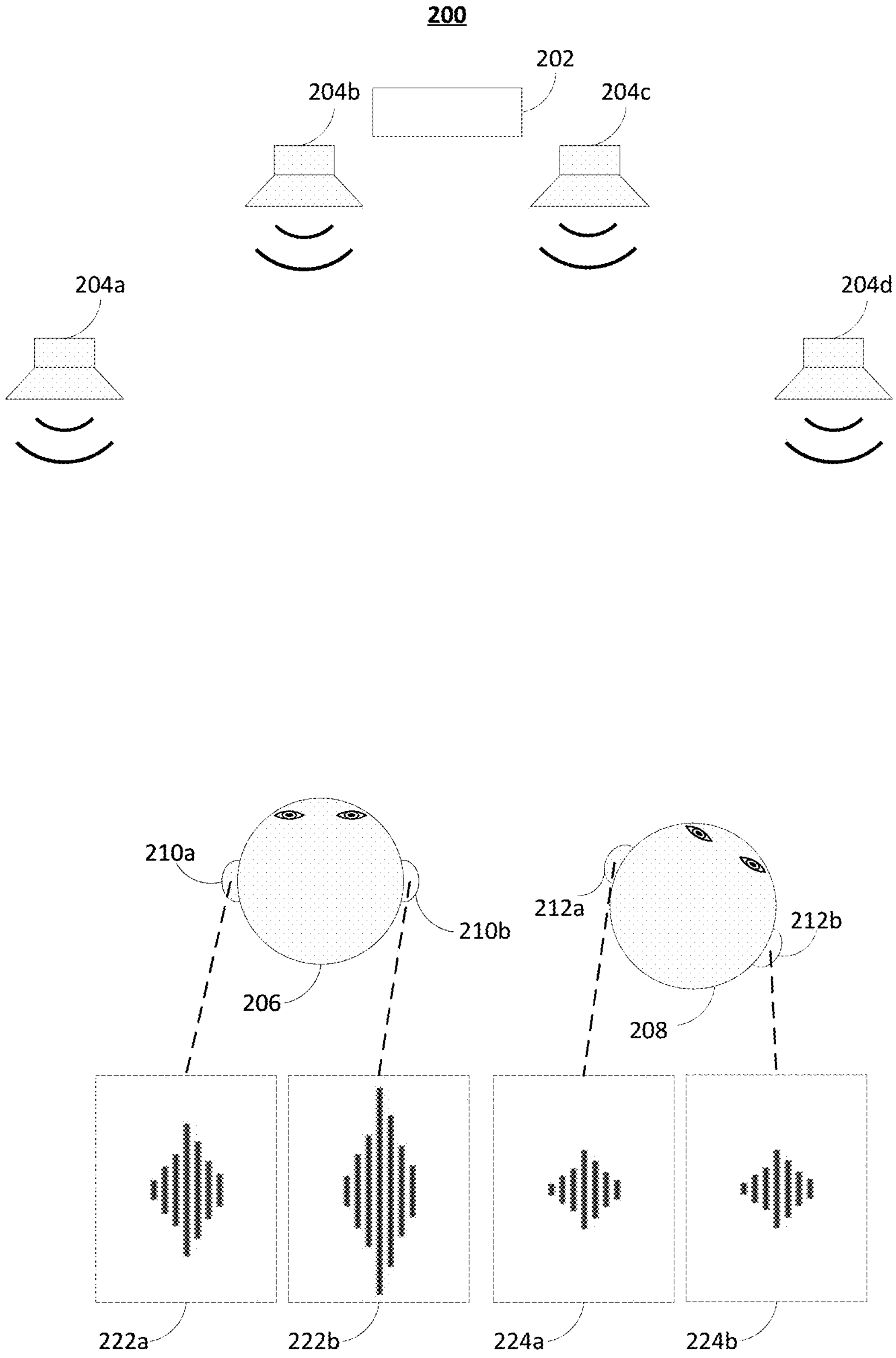

In FIG. 2C, the first device 202 may use the second position of the second user 208 and the positions of the speakers to determine a second plurality of distances. For example, the first device 202 may determine a fifth distance 220*a* between the second user 208 and the first speaker 204*a*, a sixth distance 220*b* between the second user 208 and the second speaker 204*b*, a seventh distance 220*c* between the second user 208 and the third speaker 204*c*, and an eighth distance 220*d* between the second user 208 and the fourth speaker 204*d*. In some embodiments, the first device 202 uses the second orientation 216 of the second user 206 and the positions of the speakers to determine a second plurality of angles. For example, the first device 202 may determine a fourth angle (e.g., 80°) between the second orientation 216 of the second user 208 and the first speaker 204*a*, a fifth angle (e.g., 60°) between the second orientation 216 of the second user 208 and the second speaker 204*b*, a sixth angle (e.g., 40°) between the second orientation 216 of the second user 208 and the third speaker 204*c*, and an eighth angle (e.g., 5°) between the second orientation 216 of the second user 208 and the fourth speaker 204*d*. In some embodiments, one or more of the distances of the second plurality of distances and/or one or more of the angles of the second plurality of angles are entered by a user.

The first device 202 may then determine one or more weights corresponding to one or more frequencies played at the plurality of speakers using the determined distances and angles. In some embodiments, the following equation may be used to calculate one or more weights:

$$\sum_{i=1}^{N} \frac{W_i}{d_{i\_j}^2} H_j(f, \theta_{i\_j}) = A_j(f) \ \ldots \quad (1)$$

N: The number of speakers.

f: A frequency.

$d_{i\_j}$: The distance between the head of the jth ear the ith speaker.

$\theta_{i\_j}$: The angle between the head of the jth ear and the ith speaker.

$H_j(f, \theta_{i\_j})$: The HRTF for the jth ear at the frequency (f) for sound coming from the ith speaker in the angle of $\theta_{i\_j}$.

$A_j(f)$: Audio setting for the jth ear at the frequency (f).

$W_i(f)$: The weight for the ith speaker at the frequency (f).

The first device 202 may determine the audio setting using any of the methodologies described herein. In some embodiments, the audio setting corresponds to an audiogram associated with a user (e.g., first user 206). For example, the first device 202 may access a first user profile associated with the first user 206, where the first user profile comprises an audiogram with a first audio setting corresponding to a frequency. In some embodiments, the HRTF is associated with one or more user profiles. In some embodiments, the first device 202 may determine the HRTF based on one or more characteristics of a user (e.g., first user 206). For example, the first device 202 may use computer vision and/or scanning technologies to determine dimensions corresponding to the body, head, first ear 210*a*, and/or second ear 210*b*, of the first user 206.

In some embodiments, for a first frequency (e.g., 10 kHz), the first device 202 uses Equation 1 to solve a system of liner equations to determine a first weight for the first speaker 204*a* to output the first frequency, a second weight for the second speaker 204*b* to output the first frequency, a third weight for the third speaker 204*c* to output the first frequency, and a fourth weight for the fourth speaker 204*d* to output the first frequency. In some embodiments, the calculated weights correspond to amplitudes and/or phases of the outputted frequency. For example, the first weight may correspond to the first speaker 204*a* outputting the first frequency at a first amplitude and a first phase while the second weight may correspond to the second speaker 204*b* outputting the first frequency at a second amplitude and a second phase.

Using Equation 1, the first device 202 may determine the following system of equations:

$$\sum_{i=1}^{N} \frac{W_i}{d_{i\_1}^2} H_j(f, \theta_{i\_1}) = A_1(f) \ \ldots \ . \tag{2}$$

N: The number of speakers (four)

f: First frequency (10 kHz)

$d_{i\_1}$: The ith distance of the first plurality of distances between the first user 206 and the ith speaker.

$\theta_{i\_j}$: The ith angle of the first plurality of angles between the first orientation 214 of the first user 206 and the ith speaker.

$H_j(f, \theta_{i\_j})$: The HRTF for the first ear 210*a* of the first user 206 at the frequency (10 kHz) for sound coming from the ith speaker at the ith angle of the first plurality of angles.

$A_1(f)$: Audio setting for the first ear 210*a* of the first user 206 at the frequency (10 kHz).

$W_i(f)$: The weight for the ith speaker at the frequency (10 kHz).

$$\sum_{i=1}^{N} \frac{W_i}{d_{i\_1}^2} H_j(f, \theta_{i\_1}) = A_2(f) \ \ldots \ . \tag{3}$$

N: The number of speakers (four)

f: First frequency (10 kHz)

$d_{i\_1}$: The ith distance of the first plurality of distances between the first user 206 and the ith speaker.

$\theta_{i\_j}$: The ith angle of the first plurality of angles between the first orientation 214 of the first user 206 and the ith speaker.

$H_j(f, \theta_{i\_j})$: The HRTF for the second ear 210*b* of the first user 206 at the frequency (10 kHz) for sound coming from the ith speaker at the ith angle of the first plurality of angles.

$A_2(f)$: Audio setting for the second ear 210*b* of the first user 206 at the frequency (10 kHz).

$W_i(f)$: The weight for the ith speaker at the frequency (10 kHz).

$$\sum_{i=1}^{N} \frac{W_i}{d_{i\_1}^2} H_j(f, \theta_{i\_1}) = A_3(f) \ \ldots \ . \tag{4}$$

N: The number of speakers (four)

f: First frequency (10 kHz)

$d_{i\_1}$: The ith distance of the second plurality of distances between the second user 208 and the ith speaker.

$\theta_{i\_j}$: The ith angle of the second plurality of angles between the second orientation 216 of the second user 208 and the ith speaker.

$H_j(f, \theta_{i\_j})$: The HRTF for the first ear 212*a* of the second user 208 at the frequency (10 kHz) for sound coming from the ith speaker at the ith angle of the second plurality of angles.

$A_2(f)$: Audio setting for the first ear 212*a* of the second user 208 at the frequency (10 kHz).

$W_i(f)$: The weight for the ith speaker at the frequency (10 kHz).

$$\sum_{i=1}^{N} \frac{W_i}{d_{i\_1}^2} H_j(f, \theta_{i\_1}) = A_4(f) \ \ldots \ . \tag{5}$$

N: The number of speakers (four)

f: First frequency (10 kHz)

$d_{i\_1}$: The ith distance of the second plurality of distances between the second user 208 and the ith speaker.

$\theta_{i\_j}$: The ith angle of the second plurality of angles between the second orientation 216 of the second user 208 and the ith speaker.

$H_j(f, \theta_{i\_j})$: The HRTF for the second ear 212*b* of the second user 208 at the frequency (10 kHz) for sound coming from the ith speaker at the ith angle of the second plurality of angles.

$A_2(f)$: Audio setting for the second ear 212*b* of the second user 208 at the frequency (10 kHz).

$W_i(f)$: The weight for the ith speaker at the frequency (10 kHz).

The first device 202 may use Equations 2-5 to solve for different weights for the plurality of speakers to output the first frequency so that the users perceive their own frequency preferences while consuming the same piece of media content. For example, in response to the first device 202 determining the plurality of weights, the first speaker 204*a* may output the first frequency at a first weight, the second speaker 204*b* may output the first frequency at a second weight, the third speaker 204*c* may output the first frequency at a third weight, and the fourth speaker 204*d* may output the first frequency at a fourth weight. In response to the plurality of speakers outputting the first frequency at the plurality of calculated weights, the first ear 210*a* of the first user 206 may perceive the first frequency at a first volume 222*a*, the second ear 210*b* of the first user 206 may perceive the first frequency at a second volume 222*b*, the first ear 212*a* of the second user 208 may perceive the first frequency at a third volume 224*a*, and the second ear 212*b* of the second user 208 may perceive the first frequency at a fourth volume 224*b*. In some embodiments, the perceived volume for the first frequency is different between two ears. For example, the first volume 222*a* perceived with the first ear 210*a* of the first user 206 may be different than the second volume 222*b* perceived with the second ear 210*b* of the first user 206. In some embodiments, the perceived volume for the first frequency is the same for both ears. For example, the third volume 224*a* perceived with the first ear 212*a* of the second user 208 may be the same as the fourth volume 224*b* perceived with the second ear 212*b* of the second user 208.

The following values are illustrative only and similar such values and/or techniques may be used. To simplify the disclosure, only the amplitudes are shown (e.g., the phase information is omitted). In some embodiments, the following audio settings are received:

$$A_1(f)=2$$

$$A_2(f)=2.1$$

$$A_3(f)=2.5$$

$$A_4(f)=2.7$$

In said embodiment, the following matrix may correspond to the distances from the ith speaker to the ith ear:

$$\begin{bmatrix} 2 & 2.1 & 3 & 3.1 \\ 1.5 & 1.4 & 2 & 1.9 \\ 1.8 & 1.9 & 3 & 3.1 \\ 2.2 & 2.3 & 1.7 & 1.8 \end{bmatrix}$$

In said embodiment, the following matrix may correspond to the HRTF at the ith ear towards the ith speaker direction:

$$\begin{bmatrix} 1 & 1.1 & 1.2 & 1.3 \\ 1.2 & 1.1 & 1.3 & 1.1 \\ 1.8 & 1.4 & .9 & .8 \\ 1.2 & 1.5 & 1.6 & 1.4 \end{bmatrix}$$

As described above, only the amplitudes are shown and phase information is omitted. Using the above values and a system of linear equations (e.g., Equations 2-5) the linear system to be solved may be:

$$\begin{bmatrix} 1/2^2 & 1.1/2.1^2 & 1.2/3^2 & 1.3/3.1^2 \\ 1.2/1.5^2 & 1.1/1.4^2 & 1.3/2^2 & 1.1/1.9^2 \\ 1.8/1.8^2 & 1.4/1.9^2 & 0.9/3^2 & 0.8/3.1^2 \\ 1.2/2.2^2 & 1.5/2.3^2 & 1.6/1.7^2 & 1.4/1.8^2 \end{bmatrix} \times \begin{bmatrix} W_1 \\ W_2 \\ W_3 \\ W_4 \end{bmatrix} = \begin{bmatrix} 2 \\ 2.1 \\ 2.5 \\ 2.7 \end{bmatrix}$$

Which equals:

$$\begin{bmatrix} 0.25 & 0.249 & 0.133 & 0.135 \\ 0.533 & 0.561 & 0.325 & 0.305 \\ 0.556 & 0.388 & 0.1 & 0.083 \\ 0.248 & 0.284 & 0.554 & 0.432 \end{bmatrix} \times \begin{bmatrix} W_1 \\ W_2 \\ W_3 \\ W_4 \end{bmatrix} = \begin{bmatrix} 2 \\ 2.1 \\ 2.5 \\ 2.7 \end{bmatrix}$$

Accordingly, $$\begin{bmatrix} W_1 \\ W_2 \\ W_3 \\ W_4 \end{bmatrix} = \begin{bmatrix} 27.101 \\ -35.900 \\ -65.753 \\ 95.624 \end{bmatrix}$$

In such an embodiment, the first weight or a first speaker e.g., first speaker 204*a*) is 27.101, the second weight for a second speaker (e.g., second speaker 204*b*) is −35.900, the third weight for a third speaker (e.g., third speaker 204*c*) is −65.753, and the fourth weight for a fourth speaker (e.g., fourth speaker 204*d*) is 95.624.

Figure 3:
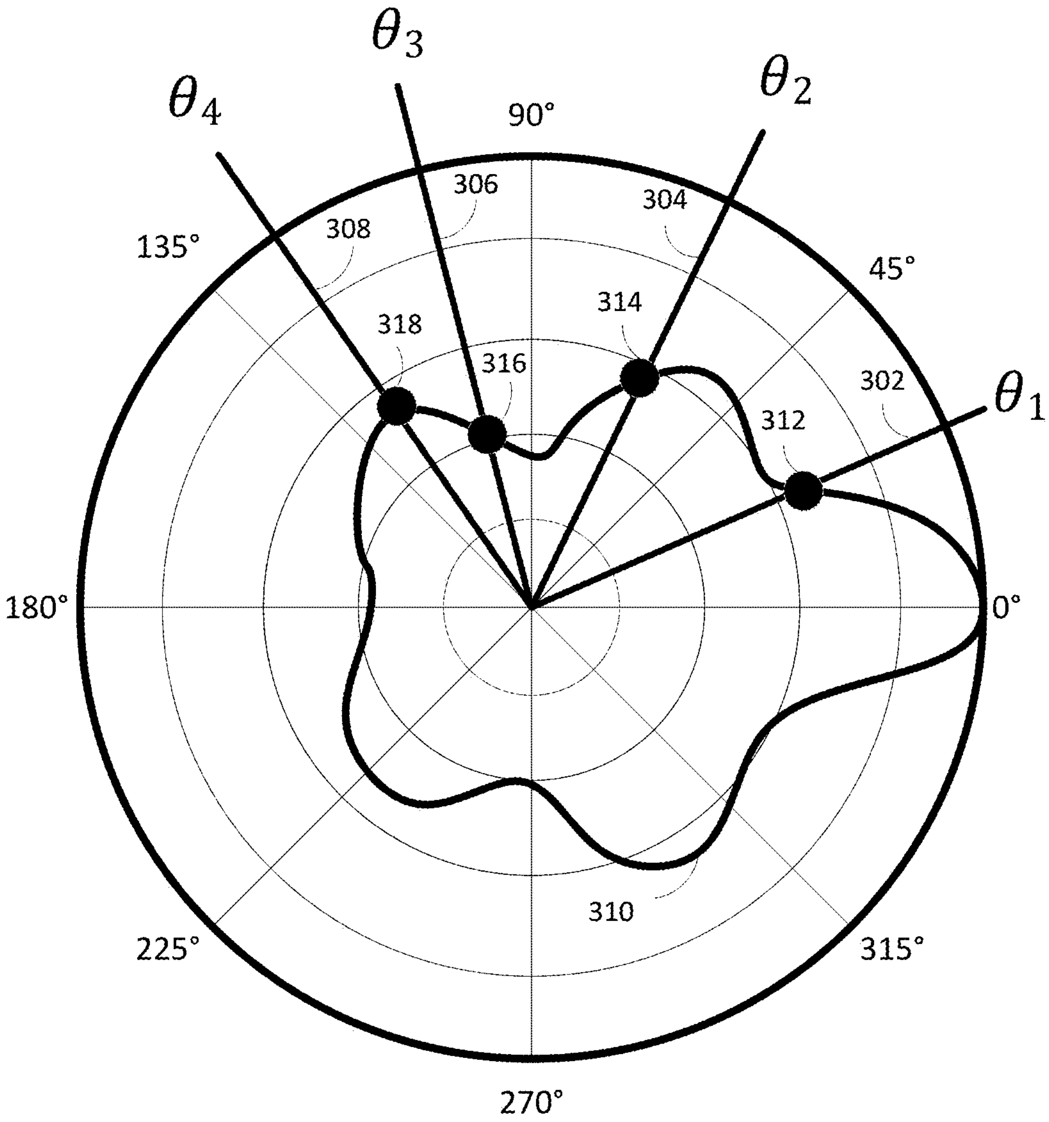
FIG. 3 shows an illustrative diagram of an HRTF for an ear of a user, in accordance with embodiments of the disclosure.

FIG. 3 shows an illustrative diagram 300 of an HRTF 310 for an ear of a user, in accordance with embodiments of the disclosure. In some embodiments, each circle represents a different volume level, and the volume increases the further the circle is away from the origin. For example, the smallest circle may represent 10 dB while the largest circle may represent 50 dB. The HRTF 310 displays the frequency response for one or more frequencies in any direction. For example, the HRTF 310 shows that the volume of the first frequency is measured at 50 dB if a speaker outputted the first frequency directly in front (0° from the orientation of the first ear) of the first ear of the first user. In another example, the HRTF 310 shows that the volume of the first frequency is measured at under 20 dB if the speaker outputted the first frequency directly behind (180° from the orientation of the first ear) of the first ear of the first user.

In some embodiments, one or more devices use an HRTF (e.g., HRTF 310) to calculate one or more weights for one or more speakers. For example, a first speaker may be a first angle (e.g., $\theta_1$) from the orientation of the first ear of the first user, a second speaker may be a second angle (e.g., $\theta_2$) from the orientation of the first ear of the first user, a third speaker may be a third angle (e.g., $\theta_3$) from the orientation of the first ear of the first user, and a fourth speaker may be fourth angle (e.g., $\theta_4$) from the orientation of the first ear of the first user. In some embodiments, each speaker corresponds to a line in the diagram 300. For example, the first speaker may correspond to the first line 302, the second speaker may correspond to the second line 304, the third speaker may correspond to the third line 306, and the fourth speaker may correspond to the fourth line 308.

In some embodiments, the point where the line corresponding to a speaker intersects with the HRTF 310 corresponds to a value used to calculate the weight for the corresponding speaker. For example, the first point 312 where the first line 302 intersects with the HRTF 310 corresponds to a first value used to calculate a first weight for a frequency for the first speaker. In another example, the second point 314 where the second line 304 intersects with the HRTF 310 corresponds to a second value used to calculate a second weight for the frequency for the second speaker. In another example, the third point 316 where the third line 306 intersects with the HRTF 310 corresponds to a third value used to calculate a third weight for the frequency for the third speaker. In another example, the fourth point 318 where the fourth line 308 intersects with the HRTF 310 corresponds to a fourth value used to calculate a fourth weight for the frequency for the fourth speaker.

Figure 4:
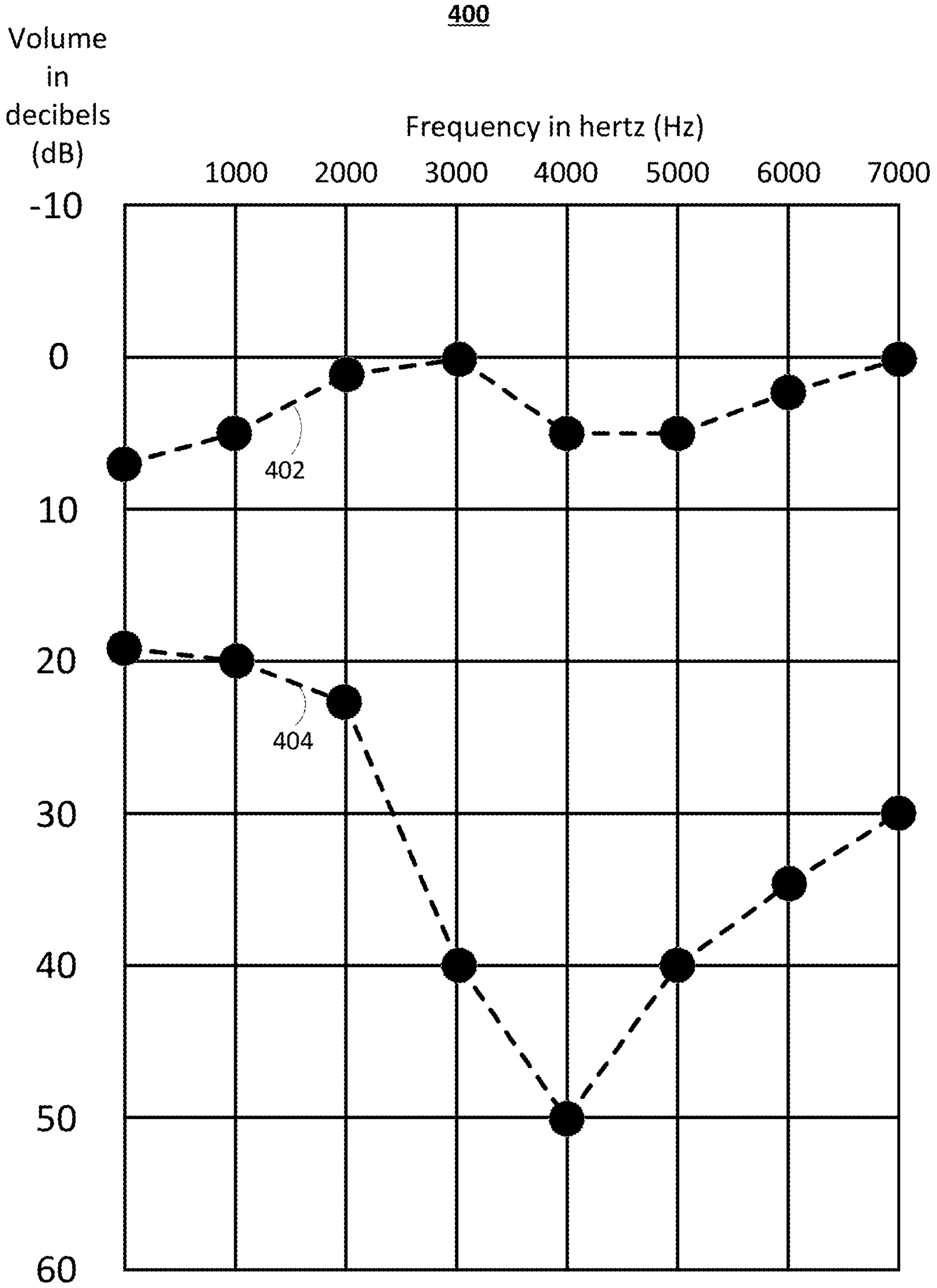
FIG. 4 shows an illustrative diagram of audio settings corresponding to one or more users, in accordance with embodiments of the disclosure.

FIG. 4 shows an illustrative diagram 400 of audio settings corresponding to one or more users, in accordance with embodiments of the disclosure. In some embodiments, the diagram 400 shows a first audio setting 402 and a second audio setting 404. In some embodiments, the first audio setting 402 corresponds to a first ear of a user and the second audio setting 404 corresponds to a second ear of a user. In some embodiments, the first audio setting 402 corresponds to a first user and the second audio setting 404 corresponds to a second user. Although only two audio settings are shown, any number of audio settings may be included in diagram 400. For example, the diagram 400 may comprise four audio settings where two audio setting correspond to a first and a second ear of a first user and the other two audio settings correspond a first and a second ear of a second user. In some embodiments, the audio settings correspond to one or more audiograms associated with one or more users.

In some embodiments, the diagram 400 comprises a horizontal axis (x-axis) and a vertical axis (y-axis). For example, the horizontal axis may correspond to different frequencies and the vertical axis may correspond to different volumes. In some embodiments, one or more devices (e.g., first device 102) uses one or more audio settings to determine a frequency preference. For example, the one or more devices may use the first audio setting 402 to determine a volume increase of 5 dB at 4000 Hz. This may indicate that the user associated with the first audio setting 402 prefers an increase in the volume in relation to the reference level at 4000 Hz. In another example, the one or more devices may use the first audio setting 402 to determine a volume of 0 dB at 3000 Hz. This may indicate that the user associated with the first audio setting 402 prefers no change in the volume in relation to the reference level at 3000 Hz.

In some embodiments, the first audio setting 402 and/or the second audio are generated automatically. For example, a first user may transmit a first audiogram corresponding to the first user's first ear and second ear to a first device. The first device may generate the first audio setting 402 corresponding to the first ear of the first user and generate the second audio setting 404 corresponding to the second ear of the first user. In some embodiments, one or more users can manually enter and/or adjust the first audio setting 402 and/or the second audio setting 404. For example, the second user may input 40 dB at 3000 Hz, 50 dB at 4000 Hz, and 40 dB at 5000 Hz, and a device generates the second audio setting 404.

In some embodiments, the users may select one or more options provided by a device. The one or more selectable options may correspond to volume levels. For example, the device may provide a number scale ranging from one to five with five being the loudest. In such an example, the second user may select a one for 2000 Hz, a three for 3000 Hz, a four for 4000 HZ, and a three at 5000 Hz. In response to the user selections, the device may generate the second audio setting 404. In another example, the device may provide selectable options "softer," "normal," "loud," "louder," and "loudest." In such an example, the second user may select "loud" for 2000 Hz, "louder" for 3000 Hz, "loudest" for 4000 HZ, and "louder" for 5000 Hz. In response to the user selections, the device may generate the second audio setting 404. In some embodiments, the diagram 400 is displayed for a user. In some embodiments, the displayed diagram 400 is adjustable. For example, one or more users may use a touch screen or mouse to move one or more points of the audio settings.

Figure 5:
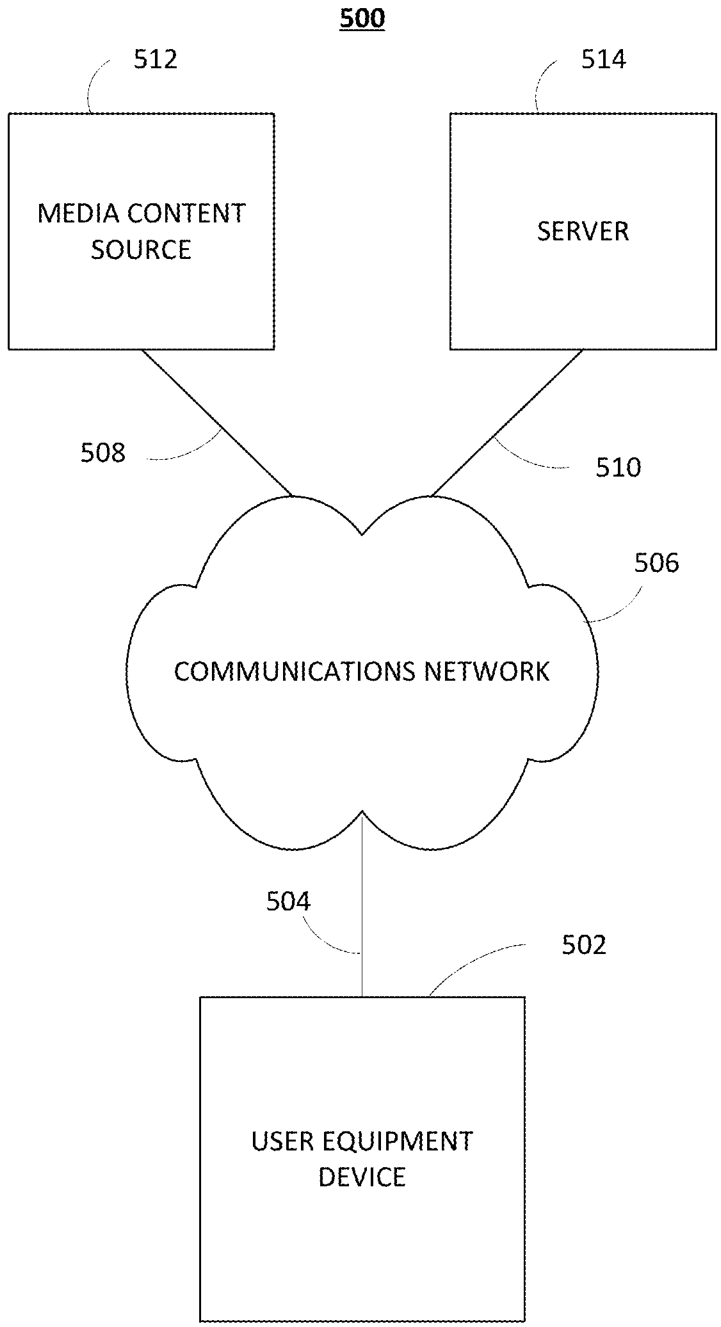
FIG. 5 shows an illustrative block diagram of a media system, in accordance with embodiments of the disclosure.
Figure 6:
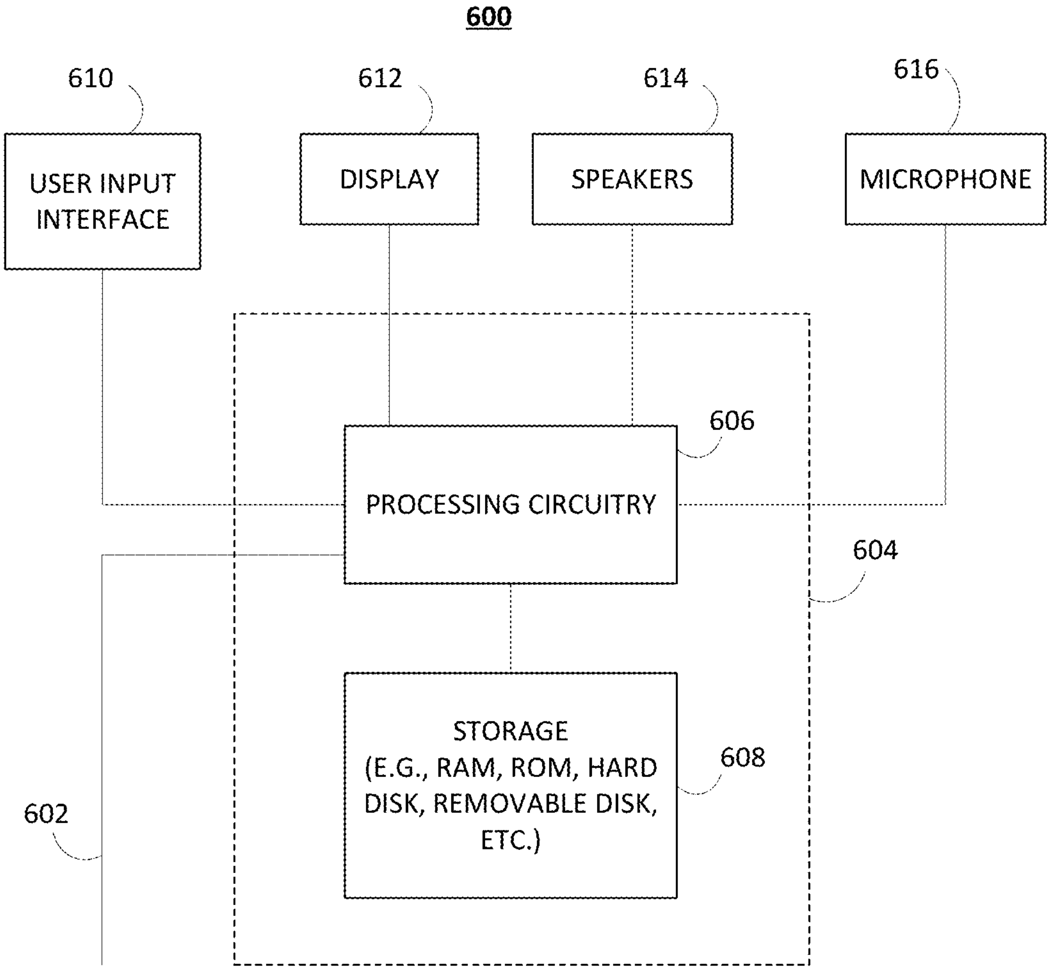
FIG. 6 shows an illustrative block diagram of a user equipment (UE) device system, in accordance with embodiments of the disclosure.

FIGS. 5-6 describe example devices, systems, servers, and related hardware for providing personalized audio settings to multiple users, in accordance with some embodiments of the disclosure. In the system 500, there can be more than one user equipment device 502, but only one is shown in FIG. 5 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 506.

The user equipment devices may be coupled to communications network 506. Namely, the user equipment device 502 is coupled to the communications network 506 via communications path 504. The communications network 506 may be one or more networks including the Internet, a mobile phone network, mobile voice or data network (e.g., a 5G or LTE network), cable network, public switched telephone network, or other types of communications network or combinations of communications networks. The communications network 506 may connected to a media content source through a second path 508 and may be connected to a server 514 through a third path 510. The paths may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, the paths may be wireless paths. Communications between the devices may be provided by one or more communications paths but is shown as a single path in FIG. 5 to avoid overcomplicating the drawing.

The system 500 also includes media content source 512, and server 514, which can be coupled to any number of databases providing information to the user equipment devices. The media content source 512 represents any computer-accessible source of content, such as a storage for media assets (e.g., audio asset), metadata, or, similar such information. The server 514 may store and execute various software modules to implement the providing of personalized audio settings to multiple users functionality. In some embodiments, the user equipment device 502, media content source 512, and server 514 may store metadata associated with a video, audio asset, and/or media item.

FIG. 6 shows a generalized embodiment of a user equipment device 600, in accordance with one embodiment. In an embodiment, the user equipment device 600 is the same user equipment device 502 of FIG. 5. The user equipment device 600 may receive content and data via input/output (I/O) path 602. The I/O path 602 may provide content (e.g., broadcast programming, on-demand programming, Internet content, content available over a local area network (LAN) or wide area network (WAN), and/or other content) and data to control circuitry 604, which includes processing circuitry 606 and a storage 608. The control circuitry 604 may be used to send and receive commands, requests, and other suitable data using the I/O path 602. The I/O path 602 may connect the control circuitry 604 (and specifically the processing circuitry 606) to one or more communications paths. I/O functions may be provided by one or more of these communications paths but are shown as a single path in FIG. 6 to avoid overcomplicating the drawing.

The control circuitry 604 may be based on any suitable processing circuitry such as the processing circuitry 606. As referred to herein, processing circuitry 606 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of personalized audio settings to multiple users functionality can be at least partially implemented using the control circuitry 604. The providing of personalized audio settings to multiple users functionality described herein may be implemented in or supported by any suitable software, hardware, or combination thereof. The providing of personalized audio settings to multiple users functionality can be implemented on the user equipment, on remote servers, or across both.

In client/server-based embodiments, the control circuitry 604 may include communications circuitry suitable for communicating with one or more servers that may at least implement the described providing of personalized audio settings to multiple users functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 608 that is part of the control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 608 may be used to store various types of content described herein. Nonvolatile memory may also be used (e.g., to launch a boot-up routine and other instructions). Cloud-based storage, described in relation to FIG. 5, may be used to supplement the storage 608 or instead of the storage 608.

The control circuitry 604 may include audio generating circuitry and tuning circuitry, such as one or more analog tuners, audio generation circuitry, filters or any other suitable tuning or audio circuits or combinations of such circuits. The control circuitry 604 may also include scaler circuitry for upconverting and down converting content into the preferred output format of the user equipment device 600. The control circuitry 604 may also include digital-to-analog converter circuitry and analog-to-digital converter circuitry for converting between digital and analog signals. The tuning and encoding circuitry may be used by the user equipment device 600 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 608 is provided as a separate device from the user equipment device 600, the tuning and encoding circuitry (including multiple tuners) may be associated with the storage 608.

The user may utter instructions to the control circuitry 604, which are received by the microphone 616. The microphone 616 may be any microphone (or microphones) capable of detecting human speech. The microphone 616 is connected to the processing circuitry 606 to transmit detected voice commands and other speech thereto for processing.

The user equipment device 600 may optionally include an interface 610. The interface 610 may be any suitable user interface, such as a remote control, mouse, trackball, keypad, keyboard, touchscreen, touchpad, stylus input, joystick, or other user input interfaces. A display 612 may be provided as a stand-alone device or integrated with other elements of the user equipment device 600. For example, the display 612 may be a touchscreen or touch-sensitive display. In such circumstances, the interface 610 may be integrated with or combined with the microphone 616. When the interface 610 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 610 may be HDTV-capable. In some embodiments, the display 612 may be a 3D display.

The speakers 614 may be integrated with other elements of user equipment device 600 or may be one or more stand-alone units. In some embodiments, the speakers 614 may be dynamic speakers, planar magnetic speakers, electrostatic speakers, horn speakers, subwoofers, tweeters, and/or similar such speakers. In some embodiments, the control circuitry 604 outputs one or more audio signals to the speakers 614. In some embodiments, one or more speakers receive and output a unique audio signal. In some embodiments, one or more speakers receive and output the same audio signal. In some embodiments, the speakers 614 can change positions and/or orientation.

The user equipment device 600 of FIG. 6 can be implemented in system 500 of FIG. 5 as user equipment device 502, but any other type of user equipment suitable for conforming audio to a video may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 7:
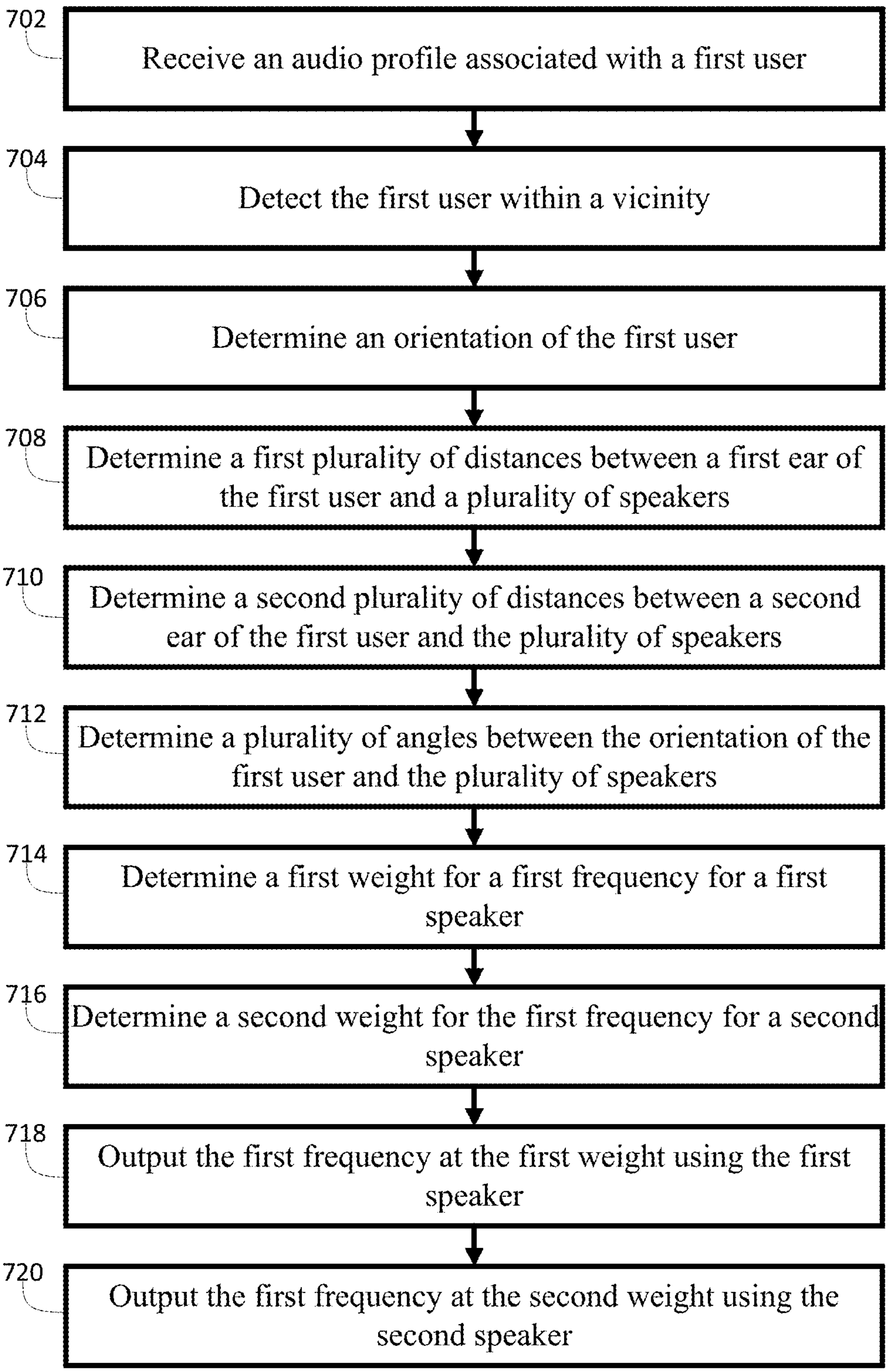
FIG. 7 shows an illustrative flowchart of a process for providing personalized audio settings to one or more users, in accordance with embodiments of the disclosure.

FIG. 7 is an illustrative flowchart of a process 700 for providing personalized audio settings to one or more users, in accordance with embodiments of the disclosure. Process 700, and any of the following processes, may be executed by control circuitry 604 on a user equipment device 600. In some embodiments, control circuitry 604 may be part of a remote server separated from the user equipment device 600 by way of a communications network or distributed over a combination of both. In some embodiments, instructions for executing process 700 may be encoded onto a non-transitory storage medium (e.g., the storage 608) as a set of instructions to be decoded and executed by processing circuitry (e.g., the processing circuitry 606). Processing circuitry may, in turn, provide instructions to other sub-circuits contained within control circuitry 604, such as the encoding, decoding, encrypting, decrypting, scaling, analog/digital conversion circuitry, and the like. It should be noted that the process 700, or any step thereof, could be performed on, or provided by, any of the devices shown in FIGS. 1-6. Although the process 700 is illustrated as described as a sequence of steps, it is contemplated that various embodiments of process 700 may be performed in any order or combination and need not include all the illustrated steps.

At 702, control circuitry receives an audio profile associated with a first user. In some embodiments, the control circuitry receives the audio profile from one or more devices. For example, the control circuitry may access one or more servers comprising one or more databases including the audio profile. In another example, a device (e.g., second device 112) may transmit the audio profile to the control circuitry. In some embodiments, a first user may input the audio profile. For example, the first user may input the audio profile using a user input interface (e.g., user input interface 610). In some embodiments, the control circuitry stores one or more audio profiles in storage (e.g., storage 608). In some embodiments, the audio profiles comprise one or more frequency preferences. For example, the audio profile associated with the first user may comprise a first frequency preference indicating a first volume level for a first ear at a first frequency and a second frequency preference indicating a second volume level for a second ear at the first frequency. In some embodiments, one or more frequency preferences correspond to an audiogram associated with the first user.

At 704, control circuitry detects the first user within a vicinity. In some embodiments, the control circuitry detects the first user by receiving a signal from a device (e.g., second device 112). The signal may also comprise the audio profile associated with the first user. In some embodiments, the control circuitry may use a sensor to detect the first user within the vicinity of the control circuitry. The sensor may be an image sensor, proximity sensor, infrared sensor, and/or similar such sensor. In some embodiments, the control circuitry detects the first user in response to an input. For example, the first user may use a remote, user input interface (e.g., user input interface 610), and/or a device (e.g., second device 112) to input a command requesting the control circuitry to output a piece of media content. In some embodiments, the control circuitry uses the same or similar methods to determine positions related to the ears of the first user. For example, the control circuitry may use a sensor to determine a first position of the first ear of the first user and a second position of the second ear of the first user. In some embodiments, the first device 202 uses the position of the first user to approximate the positions of the ears of the first user.

At 706, control circuitry determines an orientation of the first user. In some embodiments, the control circuitry determines the orientation of the first user using a signal received from a device (e.g., second device 112). In some embodiments, the control circuitry may use a sensor to determines the orientation of the first user. In some embodiments, the control circuitry determines the orientation of the first user in response to an input. For example, the first user may use a remote, user input interface (e.g., user input interface 610), and/or a device (e.g., second device 112) to input orientation information.

At 708, control circuitry determines a first plurality of distances between a first ear of the first user and a plurality of speakers. In some embodiments, the control circuitry determines the first plurality of distances using the information used to detect the first user at step 704. For example, if the control circuitry detects the first user using a sensor at step 704, then the control circuitry may use the information received from the sensor to determine the first plurality of distances. In some embodiments, the information captured by the sensor may comprise a position of the first user and/or the position of the first ear of the first user. The control circuitry may use the position of the first user and/or the position of the first ear of the first user along with the positions of the plurality of speakers to determine the first plurality of distances. In some embodiments, the control circuitry stores the positions of the speakers in a database and uses the stored positions of the speakers to determine the first plurality of distances. In some embodiments, the information captured by the sensor comprises the positions of the speakers. In such an embodiment, the control circuitry can use the received positions of the speakers and the received position of the first user and/or the position of the first ear of the user to determine the first plurality of distances.

In some embodiments, if the control circuitry detects the first user at step 704 by receiving a signal from a device, the control circuitry may use the signal to determine the first plurality of distances. For example, the control circuitry may detect the first user by receiving a signal from a device and the signal may comprise the location of the device. In some embodiments, the control circuitry determines the first plurality of distances using the location of the device and approximates the position of the first ear of the first user. In some embodiments, the control circuitry determines the first plurality of distances using information received from one or more users. For example, the control circuitry may receive a position from the first user corresponding to the first user and/or the first ear of the first user when the first user 108 inputs a position (e.g., on the couch, three meters from the television, etc.) using a remote, user input interface, and/or a device. The control circuitry may determine the first plurality of distances using the received position.

At 710, control circuitry determines a second plurality of distances between a second ear of the first user and the plurality of speakers. In some embodiments, the control circuitry uses any of the methodologies described at step 708 to determine the second plurality of distances between the second ear of the first user and the plurality of speakers.

At 712, control circuitry determines a plurality of angles between the orientation of the first user and the plurality of speakers. In some embodiments, the control circuitry determines the plurality of angles using the information used to determine the orientation of the first user at step 706. For example, if the control circuitry detects the orientation of the first user using a sensor at step 706, then the control circuitry may use the information received from the sensor to determine the plurality of angles. The control circuitry may use the orientation of the first user, the position of the first user, and the positions of a plurality of speakers to determine the plurality of angles. In some embodiments, if the control circuitry detects the orientation of the first user at step 706 by receiving a signal from a device, the control circuitry may use the signal to determine the plurality of angles. For example, the received signal may comprise the location and/or orientation of the device. In some embodiments, the control circuitry determines the plurality of angles using the location and/or orientation of the device. In some embodiments, the control circuitry determines the plurality of angles using information received from one or more users. For example, the control circuitry may receive an orientation from the first user when the first user inputs an orientation (e.g., facing the television, facing a speaker, etc.) using a remote, user input interface, and/or a device. The control circuitry may determine the plurality of angles using the received orientation.

At 714, control circuitry determines a first weight for a first frequency for a first speaker. At 716, control circuitry determines a second weight for the first frequency for a second speaker. In some embodiments, the first frequency corresponds to one or more frequency preferences indicated in the audio profile associated with the first user received at step 702. In some embodiments, the control circuitry uses a first frequency preference for the first ear of the first user, a second frequency preference for the second ear of the first user, the first plurality of distances determined at step 708, the second plurality of distances determined at step 710, and an HRTF function that utilizes the plurality of angles determined at step 712 to determine the plurality of weights. In some embodiments, the control circuitry calculates a plurality of weights for the speakers to output the first frequency, and the first weight and the second weight are part of the plurality of weights. In some embodiments, the control circuitry uses a system of liner equations to calculate the first weight for the first speaker to output the first frequency and the second weight for the second speaker to output the first frequency. In some embodiments, the calculated weights correspond to amplitudes and/or phases of the outputted frequency. For example, the first weight may correspond to the first speaker outputting the first frequency at a first amplitude and a first phase while the second weight may correspond to the second speaker outputting the first frequency at a second amplitude and a second phase.

At 718, control circuitry output the first frequency at the first weight using the first speaker. At 720, control circuitry outputs the second frequency at the second weight using the second speaker. In some embodiments, the control circuitry uses the plurality of weights to generate one or more audio signals. In some embodiments, the one or more audio signals correspond to the same portion of a piece of media content. The control circuitry may generate different audio signals for the different speakers based on the calculated weights. For example, the control circuitry may generate a first audio signal for the first speaker and a second audio signal for the second speaker. In such an example, the first audio signal causes the first speaker to output the first frequency at the first weight and the second audio signal causes the second speaker to output the first frequency at the second weight.

In some embodiments, the speakers outputting the same frequency at different weights allows the user to consume the same piece of media content while perceiving different frequency preferences for each ear. For example, the first speaker outputting the first frequency at the first weight and the second speaker outputting the first frequency at the second weight allows the first ear of the first user to perceive the first frequency at a first volume and the second ear of the first user to perceive the first frequency at a second volume. In some embodiments, the first volume of the first frequency perceived by the first ear of the first user corresponds to a first frequency preference indicated by the audio profile received at step 702 and the second volume of the first frequency perceived by the second ear of the first user corresponds to a second frequency preference indicated by the audio profile received at step 702.

Figure 8:
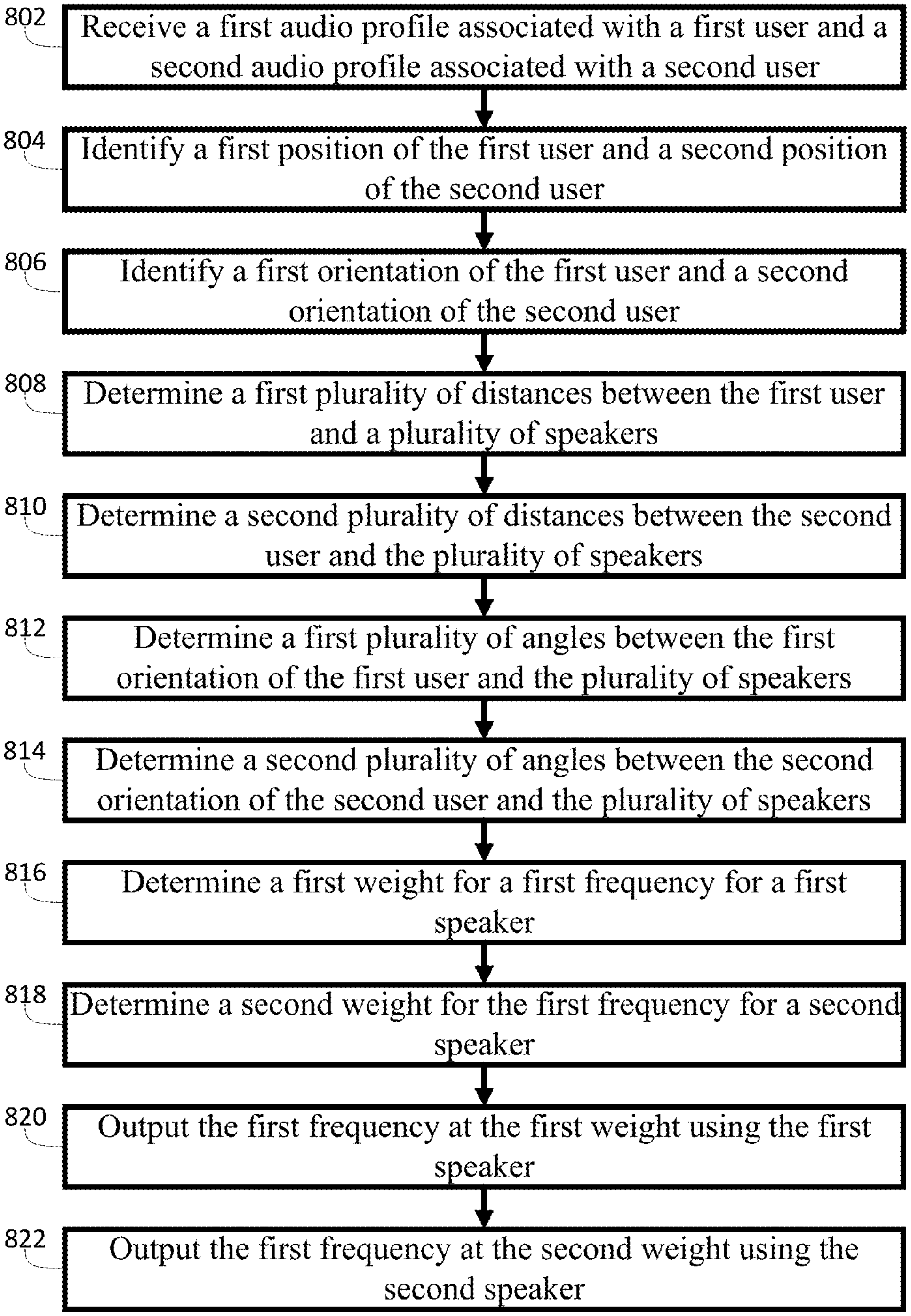
FIG. 8 shows an illustrative flowchart of a process for providing personalized audio settings to different users listening to the same piece of media content, in accordance with embodiments of the disclosure.

FIG. 8 is an illustrative flowchart of a process 800 for providing personalized audio settings to different users listening to the same piece of media content, in accordance with embodiments of the disclosure.

At 802, control circuitry receives a first audio profile associated with a first user and a second audio profile associated with a second user. In some embodiments, the control circuitry receives the first audio profile and/or the second audio profile from one or more devices. For example, the control circuitry may access one or more servers comprising one or more databases including the first audio profile and/or the second audio profile. In another example, a device (e.g., second device 112) may transmit the first audio profile and/or the second audio profile to the control circuitry. In some embodiments, the first user and/or the second user may input the first audio profile and/or the second audio profile. For example, the first user may input the first audio profile using a user input interface (e.g., user input interface 610). In some embodiments, the control circuitry stores one or more audio profiles in storage (e.g., storage 608). In some embodiments, the first audio profile and/or the second audio profile comprise one or more frequency preferences. For example, the first audio profile associated with the first user may comprise a first frequency preference indicating a first volume level at a first frequency and the second audio profile associated with the second user may comprise a second frequency preference indicating a second volume level at the first frequency. In some embodiments, one or more frequency preferences correspond to one or more audiograms associated with one or more users.

At 804, control circuitry identifies a first position of the first user and a second position of the second user. In some embodiments, the control circuitry identifies the first position and/or the second position by receiving one or more signals from one or more devices (e.g., second device 112). The one or more signals may also comprise the first audio profile and/or the second audio profile. In some embodiments, the control circuitry may use a sensor to identify that first position and/or the second position. The sensor may be an image sensor, proximity sensor, infrared sensor, and/or similar such sensor. In some embodiments, the control circuitry identifies the first position and/or the second position in response to one or more inputs. For example, the first user and/or the second user may use a remote, user input interface (e.g., user input interface 610), and/or a device (e.g., second device 112) to input the first position and/or the second position.

At 806, control circuitry identifies a first orientation of the first user and a second orientation of the second user. In some embodiments, the control circuitry determines the first orientation and/or the second orientation using a signal received from the device (e.g., second device 112). In some embodiments, the control circuitry may use a sensor to determines the first orientation and/or the second orientation. In some embodiments, the control circuitry determines the first orientation and/or the second orientation in response to one or more inputs. For example, the first user and/or second user may use a remote, user input interface (e.g., user input interface 610), and/or a device (e.g., second device 112) to input orientation information.

At 808, control circuitry determines a first plurality of distances between the first user and a plurality of speakers. In some embodiments, the control circuitry determines the first plurality of distances using the information used to identify the first position at step 804. For example, if the control circuitry identifies the first position of the first user using a sensor at step 804, then the control circuitry may use the information received from the sensor to determine the first plurality of distances. The control circuitry may use the first position of the first user along with the positions of a plurality of speakers to determine the first plurality of distances. In some embodiments, the control circuitry stores the positions of the speakers in a database and uses the stored positions of the speakers to determine the first plurality of distances. In some embodiments, the information captured by the sensor comprises the positions of the speakers. In such an embodiment, the control circuitry can use the received positions of the speakers and the first position of the first user to determine the first plurality of distances.

In some embodiments, if the control circuitry identifies the first position of the first user at step 804 by receiving a signal from a device, the control circuitry may use the signal to determine the first plurality of distances. For example, the control circuitry may detect the first position by receiving a signal from the device and the signal may comprise the location of the device. In some embodiments, the control circuitry determines the first plurality of distances using the location of the device and approximates the first position of the first user. In some embodiments, the control circuitry determines the first plurality of distances using information received from one or more users. For example, the first user may input a position (e.g., on the couch, three meters from the television, etc.) using a remote, user input interface, and/or a device. The control circuitry may determine the first plurality of distances using the received position.

At 810, control circuitry determines a second plurality of distances between the second user and the plurality of speakers. In some embodiments, the control circuitry uses any of the methodologies described at step 808 to determine the second plurality of distances between the second user and the plurality of speakers.

At 812, control circuitry determines a first plurality of angles between the first orientation of the first user and the plurality of speakers. In some embodiments, the control circuitry determines the first plurality of angles using the information used to determine the first orientation of the first user at step 806. For example, if the control circuitry identifies the first orientation of the first user using a sensor at step 806, then the control circuitry may use the information received from the sensor to determine the first plurality of angles. The control circuitry may use the first orientation of the first user, the position of the first user, and the positions of the plurality of speakers to determine the first plurality of angles. In some embodiments, if the control circuitry detects the first orientation of the first user at step 806 by receiving a signal from a device, the control circuitry may use the signal to determine the first plurality of angles. For example, the received signal may comprise the location and/or orientation of the device. In some embodiments, the control circuitry determines the first plurality of angles using the location and/or orientation of the device. In some embodiments, the control circuitry determines the first plurality of angles using information received from one or more users. For example, the control circuitry may receive the first orientation from the first user when the first user inputs an orientation (e.g., facing the television, facing a speaker, etc.) using a remote, user input interface, and/or a device. The control circuitry may determine the first plurality of angles using the received orientation.

At 814, control circuitry determines a second plurality of angles between the second orientation of the second user and the plurality of speakers. In some embodiments, the control circuitry uses any of the methodologies described at step 812 to determine the second plurality of angles between the second orientation of the second user and the plurality of speakers.

At 816, control circuitry determines a first weight for a first frequency for a first speaker. At 818, control circuitry determines a second weight for the first frequency for a second speaker. In some embodiments, the first frequency corresponds to one or more frequency preferences indicated in the first audio profile and the second audio profile received at step 802. In some embodiments, the control circuitry uses a first frequency preference for the first user, a second frequency preference for the second user, the first plurality of distances determined at step 808, the second plurality of distances determined at step 810, a first HRTF function that utilizes the first plurality of angles determined at step 808, and a second HRTF function that utilizes the second plurality of angles determined at step 810 to determine the plurality of weights. In some embodiments, the control circuitry calculates a plurality of weights for the speakers to output the first frequency, and the first weight and the second weight are part of the plurality of weights. In some embodiments, the control circuitry uses a system of liner equations to calculate the first weight for the first speaker to output the first frequency and the second weight for the second speaker to output the first frequency. In some embodiments, the calculated weights correspond to amplitudes and/or phases of the outputted frequency. For example, the first weight may correspond to the first speaker outputting the first frequency at a first amplitude and a first phase while the second weight may correspond to the second speaker outputting the first frequency at a second amplitude and a second phase.

At 820, control circuitry outputs the first frequency at the first weight using the first speaker. At 822, control circuitry outputs the first frequency at the second weight using the second speaker. In some embodiments, the control circuitry uses the plurality of weights to generate one or more audio signals. In some embodiments, the one or more audio signals correspond to the same portion of a piece of media content. The control circuitry may generate different audio signals for the different speakers based on the calculated weights.

In some embodiments, the speakers outputting the same frequency at different weights allows the first user and the second user to consume the same piece of media content while perceiving different frequency preferences. For example, the first speaker outputting the first frequency at the first weight and the second speaker outputting the first frequency at the second weight allows the first user to perceive the first frequency at a first volume and the second user to perceive the first frequency at a second volume. In some embodiments, the first volume of the first frequency perceived by the first user corresponds to a first frequency preference indicated by the first audio profile received at step 802 and the second volume of the first frequency perceived by the second user corresponds to a second frequency preference indicated by the second audio profile received at step 802.

It is contemplated that some suitable steps or suitable descriptions of FIGS. 7-8 may be used with other suitable embodiments of this disclosure. In addition, some suitable steps and descriptions described in relation to FIGS. 7-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-6 could be used to perform one or more of the steps in FIGS. 7-8.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving, by a first device, a first audio profile associated with a first user, wherein the first audio profile comprises a first set of audio settings for a first ear of the first user and a second set of audio settings for a second ear of the first user;

receiving, by the first device, a second audio profile associated with a second user, wherein the second audio profile comprises a third set of audio settings for a first ear of the second user and a fourth set of audio settings for a second ear of the second user;

detecting, by the first device, the first user within a vicinity of the first device;

determining a first orientation of the first user;

determining a first plurality of distances between the first ear of the first user and a plurality of speakers;

determining a second plurality of distances between the second ear of the first user and the plurality of speakers;

determining a first plurality of angles between the first orientation of the first user and the plurality of speakers;

detecting, by the first device, the second user within the vicinity of the first device;

determining a second orientation of the second user;

determining a third plurality of distances between the first ear of the second user and the plurality of speakers;

determining a fourth plurality of distances between the second ear of the second user and the plurality of speakers;

determining a second plurality of angles between the second orientation of the second user and the plurality of speakers;

determining a first weight for a first frequency for a first speaker using the first plurality of distances, the second plurality of distances, the third plurality of distances, the fourth plurality of distances, the first plurality of angles, the second plurality of angles, the first set of audio settings, the second set of audio settings, the third set of audio settings, and the fourth set of audio settings;

determining a second weight for the first frequency for a second speaker using the first plurality of distances, the second plurality of distances, the third plurality of distances, the fourth plurality of distances, the first plurality of angles, the second plurality of angles, the first set of audio settings, the second set of audio settings, the third set of audio settings, and the fourth set of audio settings; and outputting a piece of media content, wherein outputting the piece of media content comprises:

outputting, by the first speaker, the first frequency at the first weight; and outputting, by the second speaker, the first frequency at the second weight.

2. The method of claim 1, wherein detecting, by the first device, the first user within the vicinity of the first device comprises:

detecting a signal from a second device, wherein the second device is associated with the first user; and in response to detecting the signal from the second device, detecting, by the first device, the first user within the vicinity of the first device.

3. The method of claim 1, wherein detecting, by the first device, the first user within the vicinity of the first device comprises:

receiving an input from a sensor; and in response to receiving the input from the sensor, detecting, by the first device, the first user within the vicinity of the first device.

4. The method of claim 3, wherein the sensor is a proximity sensor.

5. The method of claim 1, wherein the first audio profile comprises an audiogram.

6. The method of claim 1, wherein:

the first set of audio settings comprise a first volume level for the first frequency; and the second set of audio settings comprise a second volume level for the first frequency.

7. The method of claim 1, wherein detecting, by the first device, the first user within the vicinity of the first device comprises:

determining a first position of the first ear of the first user; and determining a second position of the second ear of the first user.

8. The method of claim 7, wherein:

the first plurality of distances between the first ear of the first user and the plurality of speakers is determined using the first position of the first ear of the first user; and the second plurality of distances between the second ear of the first user and the plurality of speakers is determined using the second position of the second ear of the first user.

9. The method of claim 8, further comprising detecting a signal from a second device, wherein:

the signal comprises position information; and the first position of the first ear of the first user and the second position of the second ear of the first user are determined using the position information.

10. The method of claim 8, further comprising receiving an input from a sensor, wherein:

the input comprises position information; and the first position of the first ear of the first user and the second position of the second ear of the first user are determined using the position information.

11. An apparatus, comprising:

control circuitry; and at least one memory including computer program code for one or more programs, the at least one memory and the computer program code configured to, with the control circuitry, cause the apparatus to perform at least the following:

receive a first audio profile associated with a first user, wherein the first audio profile comprises a first set of audio settings for a first ear of the first user and a second set of audio settings for a second ear of the first user;

receive a second audio profile associated with a second user, wherein the second audio profile comprises a third set of audio settings for a first ear of the second user and a fourth set of audio settings for a second ear of the second user;

detect the first user within a vicinity;

determine a first orientation of the first user;

determine first plurality of distances between the first ear of the first user and a plurality of speakers;

determine a second plurality of distances between the second ear of the first user and the plurality of speakers;
determine a first plurality of angles between the first orientation of the first user and the plurality of speakers;
detecting the second user within the vicinity;
determine a second orientation of the second user;
determine a third plurality of distances between the first ear of the second user and the plurality of speakers;
determine a fourth plurality of distances between the second ear of the second user and the plurality of speakers;
determine a second plurality of angles between the second orientation of the second user and the plurality of speakers;
determine a first weight for a first frequency for a first speaker using the first plurality of distances, the second plurality of distances, the third plurality of distances, the fourth plurality of distances, the first plurality of angles, the second plurality of angles, the first set of audio settings, the second set of audio settings, the third set of audio settings, and the fourth set of audio settings;
determine a second weight for the first frequency for a second speaker using the first plurality of distances, the second plurality of distances, the third plurality of distances, the fourth plurality of distances, the first plurality of angles, the second plurality of angles, the first set of audio settings, the second set of audio settings, the third set of audio settings, and the fourth set of audio settings;
generate a first audio signal comprising the first frequency at the first weight;
generate a second audio signal comprising the first frequency at the second weight;
transmit the first audio signal to the first speaker; and
transmit the second audio signal to the second speaker.

12. The apparatus of claim 11, wherein the apparatus is further caused, when detecting, the first user within the vicinity, to:
detect a signal from a device, wherein the device is associated with the first user; and
in response to detecting the signal from the device, detect the first user within the vicinity.

13. The apparatus of claim 11, wherein the apparatus is further caused, when detecting, the first user within the vicinity, to:
receive an input from a sensor; and
in response to receiving the input from the sensor, detect the first user within the vicinity.

14. The apparatus of claim 13, wherein the sensor is a proximity sensor.

15. The apparatus of claim 11, wherein the first audio profile comprises an audiogram.

16. The apparatus of claim 11, wherein:
the first set of audio settings comprise a first volume level for the first frequency; and
the second set of audio settings comprise a second volume level for the first frequency.

17. The apparatus of claim 11, wherein the apparatus is further caused, when detecting, the first user within the vicinity, to:
determine a first position of the first ear of the first user; and
determine a second position of the second ear of the first user.

18. The apparatus of claim 17, wherein the apparatus is further caused to:
determine the first plurality of distances between the first ear of the first user and the plurality of speakers using the first position of the first ear of the first user; and
determine the second plurality of distances between the second ear of the first user and the plurality of speakers using the second position of the second ear of the first user.

19. A non-transitory computer-readable medium having instructions encoded thereon that, when executed by control circuitry, cause the control circuitry to:
receive a first audio profile associated with a first user, wherein the first audio profile comprises a first set of audio settings for a first ear of the first user and a second set of audio settings for a second ear of the first user;
receive a second audio profile associated with a second user, wherein the second audio profile comprises a third set of audio settings for a first ear of the second user and a fourth set of audio settings for a second ear of the second user;
detect the first user within a vicinity;
determine a first orientation of the first user;
determine a first plurality of distances between the first ear of the first user and a plurality of speakers;
determine a second plurality of distances between the second ear of the first user and the plurality of speakers;
determine a first plurality of angles between the first orientation of the first user and the plurality of speakers;
detect the second user within the vicinity;
determine a second orientation of the second user;
determine a third plurality of distances between the first ear of the second user and the plurality of speakers;
determine a fourth plurality of distances between the second ear of the second user and the plurality of speakers;
determine a second plurality of angles between the second orientation of the second user and the plurality of speakers;
determine a first weight for a first frequency for a first speaker using the first plurality of distances, the second plurality of distances, the third plurality of distances, the fourth plurality of distances, the first plurality of angles, the second plurality of angles, the first set of audio settings, the second set of audio settings, the third set of audio settings, and the fourth set of audio settings;
determine a second weight for the first frequency for a second speaker using the first plurality of distances, the second plurality of distances, the third plurality of distances, the fourth plurality of distances, the first plurality of angles, the second plurality of angles, the first set of audio settings, the second set of audio settings, the third set of audio settings, and the fourth set of audio settings;
generate a first audio signal comprising the first frequency at the first weight;
generate a second audio signal comprising the first frequency at the second weight;
transmit the first audio signal to the first speaker; and
transmit the second audio signal to the second speaker.

20. The method of claim 1, wherein outputting the piece of media content causes 1 the first user to hear the piece of media content according to the first set of audio settings and the second set of audio settings and (ii) the second user to hear the piece of media content according to the third set of audio settings and the fourth set of audio settings.

* * * * *